United States Patent [19]

(12) United States Patent
Wyrwas et al.

(10) Patent No.: US 10,353,210 B2
(45) Date of Patent: Jul. 16, 2019

(54) SELF-ALIGNING TRAVELLING COLLIMATING LENS FOR SWEEPING LASER

(71) Applicant: QUALCOMM Incorporated, San Diego, CA (US)

(72) Inventors: John Wyrwas, Mountain View, CA (US); Robert Holman, San Jose, CA (US); Russell Gruhlke, San Jose, CA (US); Khurshid Alam, Mountain View, CA (US); Kebin Li, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 15/428,473

(22) Filed: Feb. 9, 2017

(65) Prior Publication Data

US 2018/0107007 A1   Apr. 19, 2018

Related U.S. Application Data

(60) Provisional application No. 62/409,696, filed on Oct. 18, 2016.

(51) Int. Cl.
*G02B 27/10* (2006.01)
*G02F 1/295* (2006.01)
(Continued)

(52) U.S. Cl.
CPC ........ *G02B 27/1073* (2013.01); *G01S 7/4817* (2013.01); *G01S 17/42* (2013.01);
(Continued)

(58) Field of Classification Search
CPC .... G02B 26/10; G02B 26/101; G02B 26/103; G02B 27/30; G02B 27/1073;
(Continued)

(56) References Cited

U.S. PATENT DOCUMENTS 3,944,332 A * 3/1976 Tutihasi ................. G02F 1/135
   349/26
4,257,701 A * 3/1981 Hirayama .......... H04N 1/00254
   399/5

(Continued)

FOREIGN PATENT DOCUMENTS

CN          103217850 A      7/2013

OTHER PUBLICATIONS

Gural'nik I.P., et al., "Optically Controlled Spherical Liquid-Crystal Lens: Theory and Experiment", Quantum Electronics, Turpion Ltd., London, GB, vol. 33, No. 5, May 1, 2003, pp. 430-434, XP001235631, ISSN: 1063-7818, DOI: 10.1070/QE2003V033N05ABEH002429.

(Continued)

*Primary Examiner* — William R Alexander
*Assistant Examiner* — Ephrem Z Mebrahtu
(74) *Attorney, Agent, or Firm* — Kilpatrick Townsend & Stockton

(57) ABSTRACT

Disclosed herein are techniques for dynamically forming an optical component that automatically aligns with and changes positions with a scanning light beam to modify the wave front of the scanning light beam, such as collimating the scanning light beam. More specifically, a patterning beam that aligns with the scanning light beam may be scanned together with the scanning light beam to form the self-aligning and travelling optical component in an electro-optic material layer that is connected in serial with a photoconductive material layer to a voltage source, where the patterning beam optically modulates the impedance of the photoconductive material layer and therefore an electric field within the electro-optic material layer, the modulated electric field causing localized changes of refractive index in the electro-optic material layer to form the self-aligning and travelling optical component.

30 Claims, 16 Drawing Sheets

(51) Int. Cl.
  *G02B 26/10* (2006.01)
  *G02F 1/29* (2006.01)
  *G02B 27/30* (2006.01)
  *G01S 17/42* (2006.01)
  *G01S 7/481* (2006.01)

(52) U.S. Cl.
  CPC .......... *G02B 26/10* (2013.01); *G02B 26/101* (2013.01); *G02B 26/103* (2013.01); *G02B 27/30* (2013.01); *G02F 1/293* (2013.01); *G02F 1/295* (2013.01); *G02B 27/1006* (2013.01); *G02F 2203/05* (2013.01); *G02F 2203/12* (2013.01)

(58) Field of Classification Search
  CPC ..... G02B 27/1006; G02F 1/293; G02F 1/295; G02F 2203/05; G02F 2203/12; G01S 7/4817; G01S 17/42
  See application file for complete search history.

(56) References Cited

U.S. PATENT DOCUMENTS

| | | | | |
|---|---|---|---|---|
| 4,679,910 A | * | 7/1987 | Efron | ............... G02F 1/135 250/331 |
| 5,481,320 A | | 1/1996 | Konuma et al. | |
| 6,924,923 B2 | | 8/2005 | Serati et al. | |
| 2006/0017001 A1 | * | 1/2006 | Donders | ............. G02B 21/0036 250/390.07 |
| 2007/0216985 A1 | | 9/2007 | Woodall et al. | |
| 2008/0239458 A1 | | 10/2008 | Sachs et al. | |
| 2009/0184944 A1 | * | 7/2009 | Ishii | ...................... G09G 3/36 345/204 |
| 2010/0002155 A1 | * | 1/2010 | Yamaguchi | ......... G02F 1/13718 349/12 |
| 2011/0043717 A1 | * | 2/2011 | Valyukh | ................... G02F 1/29 349/33 |
| 2012/0105773 A1 | | 5/2012 | Burgess | |
| 2014/0284451 A1 | * | 9/2014 | Sampayan | ............... H03C 1/34 250/206 |

OTHER PUBLICATIONS

Lin Shih-Hung, et al., "Fresnel Lenses in 90[deg.] Twisted-Nematic Liquid Crystals With Optical and Electrical Controllability", IEEE Photonics Technology Letters, IEEE Service Center, Piscataway, NJ, US, vol. 28, No. 13, Jul. 1, 2016, pp. 1462-1464, XP011609770, ISSN: 1041-1135, DOI: 10.1109/LPT.2016.2555699 [retrieved on May 9, 2016].
Partial International Search Report—PCT/US2017/055846—ISA/EPO—dated Jan. 15, 2018.
International Search Report and Written Opinion—PCT/US2017/055846—ISA/EPO—dated Apr. 13, 2018.

* cited by examiner

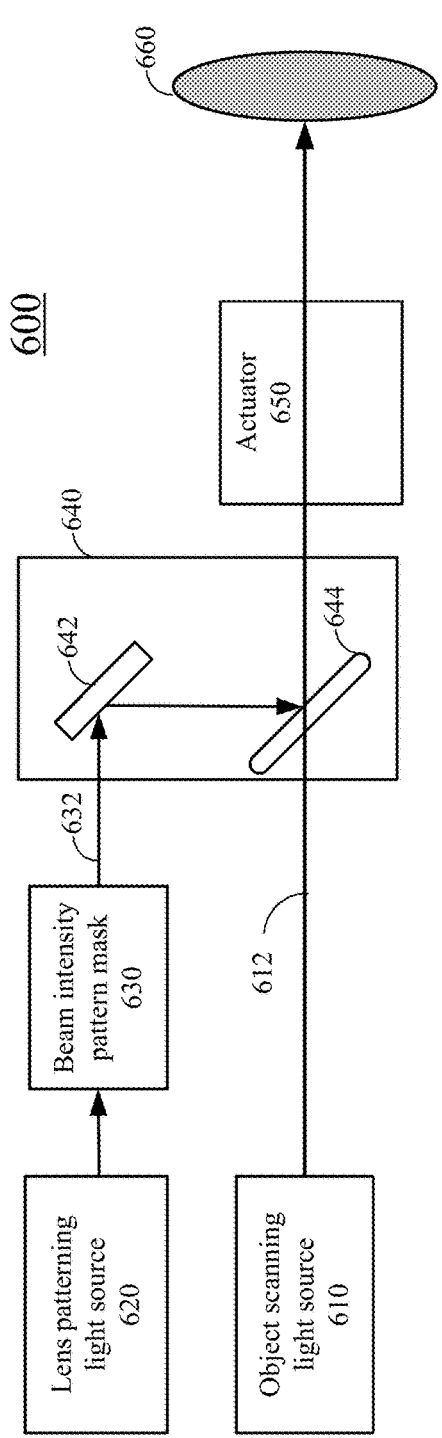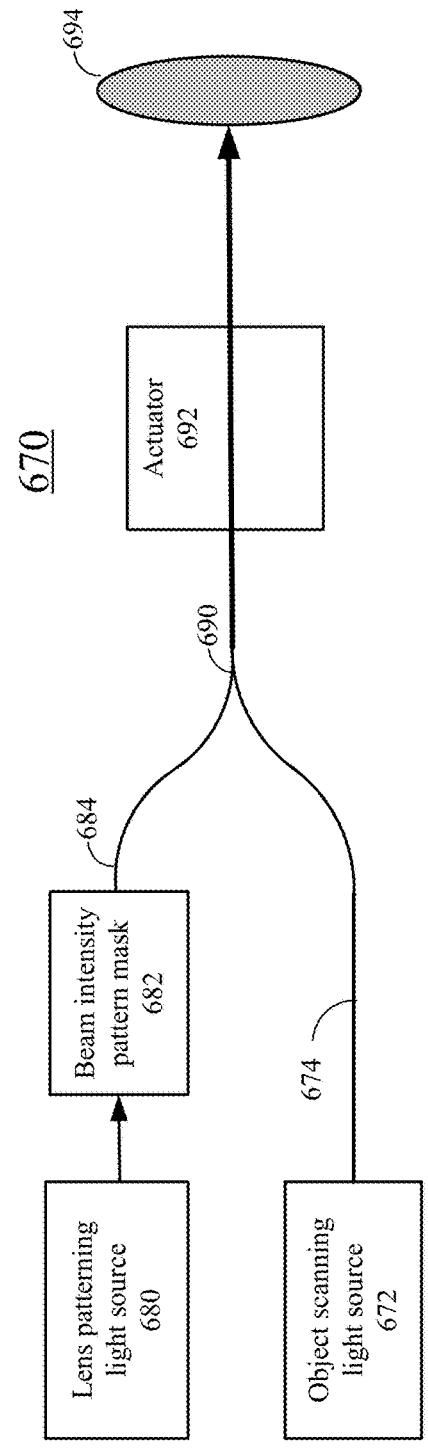
FIG. 6A
FIG. 6B

SELF-ALIGNING TRAVELLING COLLIMATING LENS FOR SWEEPING LASER

CROSS-REFERENCES TO RELATED APPLICATIONS

This patent application claims priority to U.S. Provisional Patent Application Ser. No. 62/409,696, filed Oct. 18, 2016, entitled "SELF-ALIGNING TRAVELLING COLLIMATING LENS FOR SWEEPING LASER," which is assigned to the assignee hereof and is incorporated herein by reference in its entirety for all purposes.

BACKGROUND

A sweeping light beam, such as a sweeping laser beam, may be used in many applications, such as Light Imaging, Detection, And Ranging or LIght Detection and Ranging (LIDAR or LiDAR) or LAser Detection and Ranging (LADAR) systems, projection displays, free-space laser communication systems, and biological and medical sensors. In many of these applications, it is desirable that the light beam experiences minimum width expansion as it travels in space or through media. For example, it may be desirable that the divergence angle of the light beam is no greater than 0.1 degrees in some applications. Since an output beam from a laser or other light source generally has a much larger beam divergence angle, such as 5 degrees or larger, a collimation system, such as a lens, may often be used to collimate the light beam such that the beam divergence angle can be reduced.

BRIEF SUMMARY

Techniques disclosed herein relate to optically reconfigurable optical components, more specifically, to a self-aligning lens that aligns and travels with an object scanning beam in an optical scanning system. In one example embodiment, a self-aligning collimating lens can be dynamically formed at any desired location by a lens patterning beam that aligns and at least partially overlaps with a light beam to be collimated and transmitted to a far field for object scanning (object scanning beam). The self-aligning collimating lens includes a photoconductive material layer and an electro-optic (EO) material layer arranged in a stack. The photoconductive material is sensitive to the lens patterning beam, and thus the impedance of the photoconductive material layer in different regions can be modulated by the light intensities of the lens patterning beam in the corresponding regions. When a voltage signal is applied to the stack, the modulation of the impedance of the photoconductive material layer in different regions caused by the lens patterning beam in turn causes a modulation of the voltage drop and hence the electric field in different regions of the EO material layer, which then modulates the characteristics of the EO material layer, such as the refractive index, in different regions to form a desired optical component, such as a lens.

The photoconductive material and the EO material may be transparent to the object scanning beam. When the lens has a focal length equal to the distance between the lens and a source that emits the object scanning beam, the object scanning beam may be collimated by the lens. Because the lens patterning beam and the object scanning beam are aligned, the collimating lens inherently aligns with the object scanning beam, even without any additional alignment. When the aligned lens patterning beam and object scanning beam are scanned together by a same beam scanning element or separately by two synchronized beam scanning elements, the collimating lens dynamically formed by the lens patterning beam moves with the object scanning beam automatically to keep the object scanning beam aligned with and collimated by the lens.

The disclosed techniques may also be used in applications other than collimating and scanning light beams. For example, depending on the intensity profile of a patterning beam, optical components other than a collimating lens, such as an imaging lens, a grating, a prism, a Fresnel lens, or an optical component with a more complex phase pattern, such as a volume holographic device (e.g., for beam splitting or beam combining, etc.), may be dynamically formed in the EO material layer for modifying the wave front of the object scanning beam.

In accordance with an example implementation, a system may include an electrode layer transparent to at least one wavelength of light, an electro-optic material layer transparent at the at least one wavelength, and a photoconductive material layer transparent at the at least one wavelength. The electrode layer, the electro-optic material layer, and the photoconductive material layer may be arranged in a stack, where the photoconductive material layer may be configured to spatially modulate an electric field within the electro-optic material layer according to an illumination pattern, and the electro-optic material layer may be capable of forming an optical lens for the at least one wavelength of light based on a localized change in refractive index induced by the spatially modulated electric field.

In some implementations of the system, the photoconductive material layer may be sensitive to a light beam of a second wavelength, and an impedance of the photoconductive material layer illuminated by the light beam of the second wavelength may be a function of an intensity profile of the light beam of the second wavelength. The electric field in the electro-optic material layer may be spatially modulated based on an impedance change in the photoconductive material layer corresponding to the intensity profile of the light beam of the second wavelength. In some implementations, when not illuminated by the light beam of the second wavelength, a magnitude of the impedance of the photoconductive material layer may be at least ten times higher than a magnitude of an impedance of the electro-optic material layer.

In some implementations of the system, the electrode layer, the electro-optic material layer, and the photoconductive material layer may each have a curved shape. In some implementations, the curved shape may comprise at least a portion of a spherical surface.

In some implementations, the system may include a first light source emitting a first light beam at the at least one wavelength. The system may also include a second light source emitting a second light beam at a second wavelength, where the photoconductive material layer absorbs the second light beam and changes its conductivity in response to absorbing the second light beam. In some implementations, the first light beam may include a series of first light beam pulses, and the second light beam may include a continuous wave light beam or a series of second light beam pulses. In some implementations, the system may include a beam combiner configured to combine the first light beam and the second light beam. The beam combiner may include a fiber-optic beam combiner. In some implementations, the system may also include a scanning element configured to direct the first light beam and the second light beam to a same location on the stack at a same angle. In some implementations, the system may include a first scanning element for steering the first light beam and a second scanning element for steering the second light beam, where the first scanning element is synchronized with the second scanning element. In some implementations, the system may include a mask configured to spatially modulate light intensities on a beam spot of the second light beam. The mask may include a light intensity modulation function corresponding to a phase profile of the optical lens.

In some implementations, the system may include a voltage source configured to apply a voltage signal between the electrode layer and at least one of the electro-optic material layer or the photoconductive material layer. In some implementations, the voltage signal may be applied between the electrode layer and at least one of the electro-optic material layer or the photoconductive material layer to generate the electric field, where the electric field may be substantially parallel or orthogonal to the electro-optic material layer.

In accordance with an example implementation, a method for making a self-aligning optical component in a beam scanning system is provided. The method includes forming a travelling lens stack, where forming the travelling lens stack may include forming a photoconductive material layer, forming an electro-optic material layer, and forming an electrode layer on a side of the electro-optic material layer that is opposite to the photoconductive material layer. The method further includes disposing a first light source capable of generating a first light beam at a first wavelength, where the first light source is oriented relative to the photoconductive material layer to enable the first light source to direct the first light beam towards the photoconductive material layer. The method also includes connecting a voltage source to the electrode layer and the photoconductive material layer, where the voltage source is configured to apply a voltage signal across the photoconductive material layer and the electro-optic material layer to generate an electric field within the electro-optic material layer. In various embodiments, an impedance of the photoconductive material layer may be a function of light intensities of a beam spot of the first light beam on the photoconductive material layer.

In some embodiments, the method for making the self-aligning optical component in the beam scanning system may further include disposing a second light source capable of generating a second light beam at a second wavelength, where the second light source is oriented relative to the photoconductive material layer to enable the second light source to direct the second light beam towards the photoconductive material layer at a location where the first light beam is incident on the photoconductive material layer, and the photoconductive material layer and the electro-optic material layer are transparent to the second light beam. In some embodiments, the method may include disposing a beam intensity modulator between the first light source and the travelling lens stack, where the beam intensity modulator is configured to modulate light intensities of a beam spot of the first light beam according to a phase profile of the optical component. In some embodiments, the method may include disposing a beam combiner between the first light source and the travelling lens stack, where the beam combiner is configured to combine the first light beam and a second light beam at a second wavelength, and the photoconductive material layer and the electro-optic material layer are transparent to the second light beam. The method may also include disposing a beam steering element between the beam combiner and the travelling lens stack, where the beam steering element is configured to direct the first light beam and the second light beam towards the photoconductive material layer.

In accordance with another example implementation, an apparatus may be provided, which may include means for generating a first light beam at a first wavelength; means for directing the first light beam towards a photoconductive material layer, the first light beam causing changes in an impedance of the photoconductive material layer according to light intensities of a beam spot of the first light beam; and means for applying a voltage signal across the photoconductive material layer and an electro-optic material layer to generate an electric field within the electro-optic material layer. The changes in the impedance of the photoconductive material layer according to the light intensities of the beam spot of the first light beam modulate the electric field within the electro-optic material layer, causing a localized change in refractive index of the electro-optic material layer induced by the modulated electric field to form an optical component in the electro-optic material layer.

In some implementations, the apparatus may include means for directing a second light beam at a second wavelength towards the photoconductive material layer at a location where the first light beam is incident on the photoconductive material layer, where the photoconductive material layer and the electro-optic material layer may be transparent to the second light beam. The means for directing the first light beam and the means for directing the second light beam may be synchronized. In some implementations, the apparatus may include means for combining the first light beam and the second light beam and means for directing the first light beam and the second light beam towards the photoconductive material layer. In some implementations, the apparatus may include means for modulating the light intensities of the beam spot of the first light beam according to a phase profile of the optical component.

In accordance with yet another example implementation, a non-transitory computer-readable storage medium including machine-readable instructions stored thereon is disclosed. The non-transitory computer-readable storage medium may include instructions that, when executed by one or more processors, cause the one or more processors to generate a first light beam at a first wavelength; direct the first light beam towards a photoconductive material layer, the first light beam causing changes in an impedance of the photoconductive material layer according to light intensities of a beam spot of the first light beam; and apply a voltage signal across the photoconductive material layer and an electro-optic material layer to generate an electric field within the electro-optic material layer. The changes in the impedance of the photoconductive material layer according to the light intensities of the beam spot of the first light beam modulate the electric field within the electro-optic material layer, and cause a localized change in refractive index of the electro-optic material layer induced by the modulated electric field to form a lens in the electro-optic material layer.

In some embodiments, the non-transitory computer-readable storage medium may include instructions that, when executed by one or more processors, cause the one or more processors to direct a second light beam at a second wavelength towards the photoconductive material layer at a location where the first light beam is incident on the photoconductive material layer, where the photoconductive material layer and the electro-optic material layer may be transparent to the second light beam. In some embodiments, the instructions may cause the one or more processors to combine the first light beam and the second light beam and direct the first light beam and the second light beam towards the photoconductive material layer using a beam steering element.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 6A illustrates an example self-aligning collimating system, according to some aspects of the present disclosure.

FIG. 6B illustrates an example self-aligning collimating system, according to some aspects of the present disclosure.

DETAILED DESCRIPTION

Figure 1:
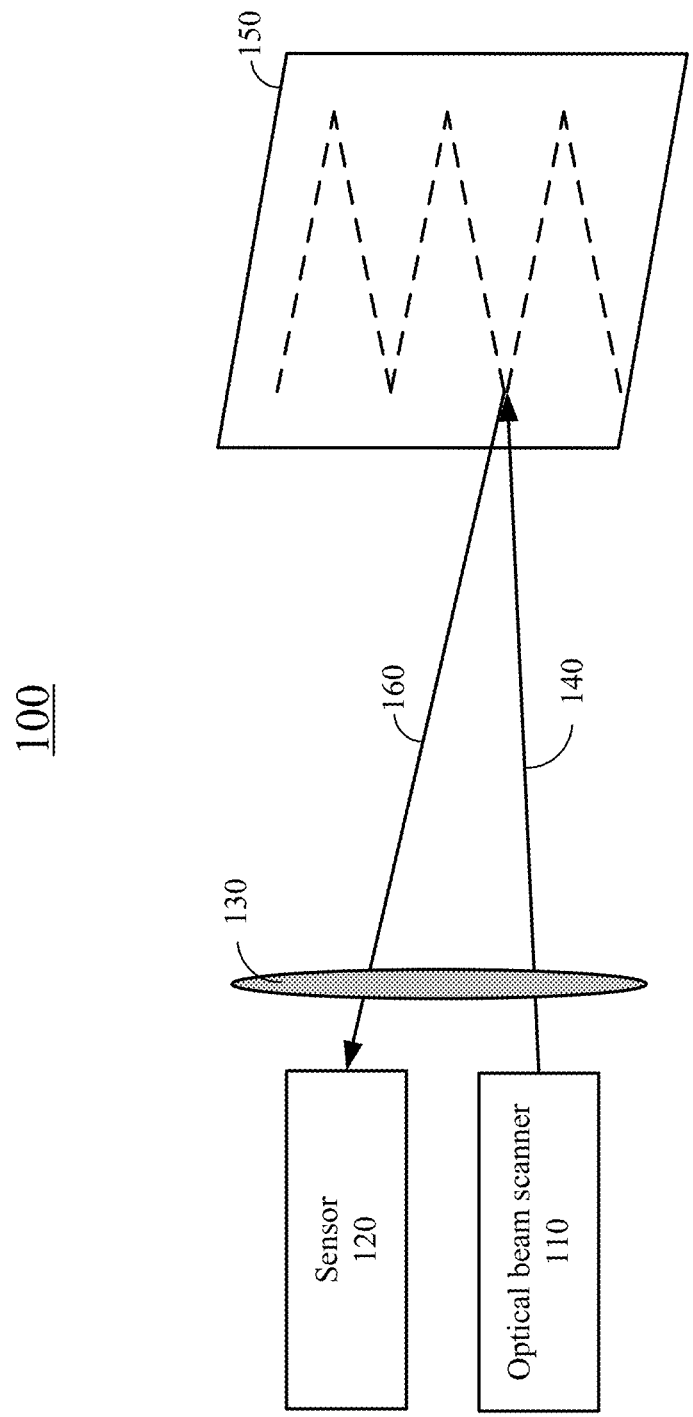
FIG. 1 is a simplified block diagram of an example optical scanning system.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description will provide those skilled in the art with an enabling description for implementing one or more embodiments. It is understood that various changes may be made in the function and arrangement of elements without departing from the spirit and scope of this disclosure.

Techniques disclosed herein relate to dynamically forming an optical component that automatically aligns with (or self-aligns with) and changes position with a scanning light beam to modify the wave front of the light beam, such as collimating the light beam. More specifically, a patterning beam that aligns and/or overlaps with the scanning light beam and that is scanned together with the scanning light beam may be used to form the self-aligning and travelling optical component by optically modulating the impedance of a photoconductive material layer and thus the electric field within an electro-optic (EO) material layer that is connected with the photoconductive material layer to a voltage source, thereby causing a modulation of the characteristics (e.g., refractive index, optical length, or phase shift) of the EO material layer. The optical component "travels" with the patterning beam that is scanned together with the scanning light beam, due to the change of the refractive index of the EO material layer caused by the moving patterning beam, even though there may not be any physical displacement or shifting of any material within the EO material layer or the photoconductive material layer.

In particular, a self-aligning collimating lens can be dynamically formed by a lens patterning beam that aligns and/or at least partially overlaps with a light beam to be collimated and transmitted to a far field for object scanning (object scanning beam). The self-aligning collimating lens includes a photoconductive material layer and an EO material layer arranged in a stack. The photoconductive material is sensitive to the lens patterning beam and can absorb photons of the lens patterning beam. Thus, the impedance of the photoconductive material in different regions can be modulated by the light intensities of the lens patterning beam in the corresponding regions. When a voltage signal is applied across the stack, the modulation of the impedance of the photoconductive material layer caused by the lens patterning beam modulates the voltage drop and hence the amplitude of the electric field in the EO material layer in various regions. The modulation of the amplitude of the electric field in the EO material layer changes the EO characteristics, such as the refractive index, of the EO material layer in different regions to form a desired optical component, such as a lens.

In various embodiments, the photoconductive material and the EO material may be transparent to the object scanning beam, and thus the object scanning beam may be transmitted through the photoconductive material layer and the EO material layer with little loss. As used herein, a material may be "transparent" to a light beam if the light beam can pass through the material with a high transmission rate, such as larger than 90%, 95%, 98%, 99%, or higher, where a small portion of the light beam (e.g., less than 10%, 5%, 2%, 1%, or less) may be scattered, reflected, or absorbed by the material. The lens patterning beam may be designed such that the lens formed in the EO material layer has a focal length equal to the distance between the lens and a light source that emits the object scanning beam. As a result, the object scanning beam may be collimated by the lens. Because the lens patterning beam and object scanning beam are aligned and/or overlapped, the collimating lens automatically aligns with the object scanning beam, even without any additional alignment. When the aligned and/or overlapped lens patterning beam and object scanning beam are scanned together by a same beam scanning element or separately by two synchronized beam steering elements, the collimating lens dynamically formed by the lens patterning beam automatically changes its positions together with the object scanning beam to keep the object scanning beam aligned with the lens and collimated by the lens.

It is noted that although specific examples of collimating lens in light detection and ranging (LIDAR) or laser detection and ranging (LADAR) systems are described below, the disclosed techniques may be used in applications other than for collimating and scanning light beams in LIDAR systems. For example, depending on the intensity profile of the patterning beam, optical components other than a collimating lens, such as an imaging lens, a grating, a prism, a Fresnel lens, a diffractive optical element, or an optical component with a more complex phase pattern, such as a volume holographic device, may be dynamically formed to modify the wave front of the object scanning beam.

I. Optical Scanning Systems

A sweeping light beam, such as a sweeping laser beam, may be used in many optical scanning systems, such as light detection and ranging systems, projection display systems, free-space laser communication systems, and biological and medical sensors. In at least some of these applications, for reasons such as the desired light beam intensity and range and resolution of the beam scanning, it is often desirable that the light beam experiences minimum width expansion as it propagates in space or through media. For example, it may be desirable that the divergence angle of the light beam is no greater than 0.1 degrees. Since an output beam from a laser or other light source may have a much larger beam divergence angle, such as 5 degrees or larger, a collimation system, such as a lens, may often be used to collimate the light beam such that the light beam divergence angle and therefore the size of the beam spot in the far field can be reduced.

A LIDAR system, also referred to as a LADAR system, is an active remote sensing system that can be used to obtain the range from a source to one or more points on a target. A LIDAR uses a light beam, typically a laser beam, to illuminate the one or more points on the target. Compared with other light sources, a laser beam may propagate over long distances without spreading significantly (highly collimated), and can be focused to small spots so as to deliver very high optical power densities and provide fine scan resolution. The laser beam may be modulated such that the transmitted laser beam includes a series of pulses. The transmitted laser beam may be directed to a point on the target, which may reflect the transmitted laser beam. The laser beam reflected from the point on the target can be measured by an optical detector, and the time of flight (ToF) from the time a pulse of the transmitted light beam is transmitted from the source to the time the pulse arrives at the optical detector near the source or at a known location may be determined. The range from the source to the point on the target may then be determined by, for example, $r=c \times t/2$, where r is the range from the source to the point on the target, c is the speed of light in free space, and t is the ToF of the pulse of the light beam from the source to the detector.

FIG. 1 is a simplified block diagram of an example system 100, such as a LIDAR, LADAR, or other like system. System 100 may include an optical beam scanner 110, a sensor 120, and an optical subsystem 130. Optical beam scanner 110 may include an optical source, such as a laser, a laser diode, a vertical cavity surface-emitting laser (VCSEL), a light-emitting diode (LED), or other optical source. The laser may be, for example, an infrared pulsed fiber laser or other mode-locked or electrical pulse-modulated laser with an output wavelength of, for example, about 650 nm, about 850 nm, 930-960 nm, 1030-1070 nm, about 1300 nm, around 1550 nm, or longer. Optical beam scanner 110 may also include a light directing device, such as a scanning stage, a piezoelectric actuator, or a microelectromechanical system (MEMS) device that can change the propagation direction of the transmitted laser beam from the laser. Optical subsystem 130 may be used to collimate the transmitted laser beam from optical beam scanner 110 such that collimated laser beam 140 may propagate over a long distance to a target 150 without spreading significantly.

Optical subsystem 130 may also be used to focus a returned laser beam 160 from target 150 onto sensor 120 directly or into optical fibers connected to sensor 120. Sensor 120 may be an optical detector having a working (sensitive) wavelength comparable with the wavelength of the optical source in optical beam scanner 110. The optical detector may be a high-speed photodetector, for example, a photodiode with an intrinsic semiconductor region between a p-type semiconductor region and an n-type semiconductor region (PIN photodiode), or an InGaAs avalanche photodetector (APD). Sensor 120 may include a one-dimensional (1-D) or two-dimensional (2-D) detector array.

To measure ranges to multiple points on a target or in a field-of-view (FOV) of a system, a laser beam is usually scanned in one or two dimensions as shown in FIG. 1. In order to achieve a 1-D or 2-D scan pattern, a system may use, for example, an array of lasers, multiple sets of lasers/sensors that are slightly tilted against each other, or other 2-D scanning mechanisms, such that the laser beam may be scanned in, for example, a horizontal raster pattern and/or a vertical raster pattern as shown in FIG. 1.

A 2-D scan pattern may be produced with a single 2-axis actuator. For example, if the horizontal axis produces a constant amplitude sine wave, and the vertical axis produces a cosine wave with the same frequency and amplitude as the sine wave, a circular scanning pattern may be generated. The scanning amplitudes on both the x and y axes can be progressively decreased and/or increased to produce a spiral scan pattern by progressively decreased and/or increased control signals. As a more specific example, if the horizontal scanning is controlled by a triangle amplitude-modulated sine wave and the vertical scanning is controlled by a triangle amplitude-modulated cosine wave, an evenly spaced spiral scan pattern may be generated.

There are many different types of laser beam scanning mechanisms, for example, a multi-dimensional mechanical stage, a Galvo-controlled mirror, a MEMS mirror driven by micro-motors, a piezoelectric translator/transducer using piezoelectric materials (e.g., a quartz, an aluminum nitride (AlN) thin film, or a lead zirconate titanate (PZT) ceramic), an electromagnetic actuator, or an acoustic actuator. Laser beam scanning may also be achieved without mechanical movement of any component, for example, using a phased array technique where phases of light beams in a 1-D or 2-D array may be changed to alter the wave front of the superimposed laser beam. Many of the above-described beam scanning mechanisms may be bulky and expensive. In some LIDAR systems, alternatively or additionally, a resonant fiber scanning technique may be used to scan a laser beam. Due to the flexibility of the optical fiber, a fast scanning speed, a wide field of view and/or a high resolution may be achieved. In addition, a resonant fiber beam scanner may be small and less expensive. In some LIDAR systems, resonant-driven MEMS mirrors may also be used to achieve a fast scanning speed.

The position or scanning angle of the scanning beam may be determined based on the control signals that drive the scanning mechanisms, such that the system can determine the point on the target that reflects a particular transmitted light beam at a given time. For example, in FIG. 1, the position of the transmitted beam on optical subsystem 130 and thus the position of the transmitted beam on target 150 may be determined based on the signal that controls optical beam scanner 110 in system 100. As a more specific example, in a system with a MEMS micro-mirror driven by micro-motors, the orientation of the MEMS micro-mirror may be determined based on the signals that control the micro-motors that rotate the micro-mirror. The direction of the reflected beam by the micro-mirror and thus the position of the beam on optical subsystem 130 at a given time can then be determined based on the orientation of the micro-mirror at the given time.

Figure 2A:
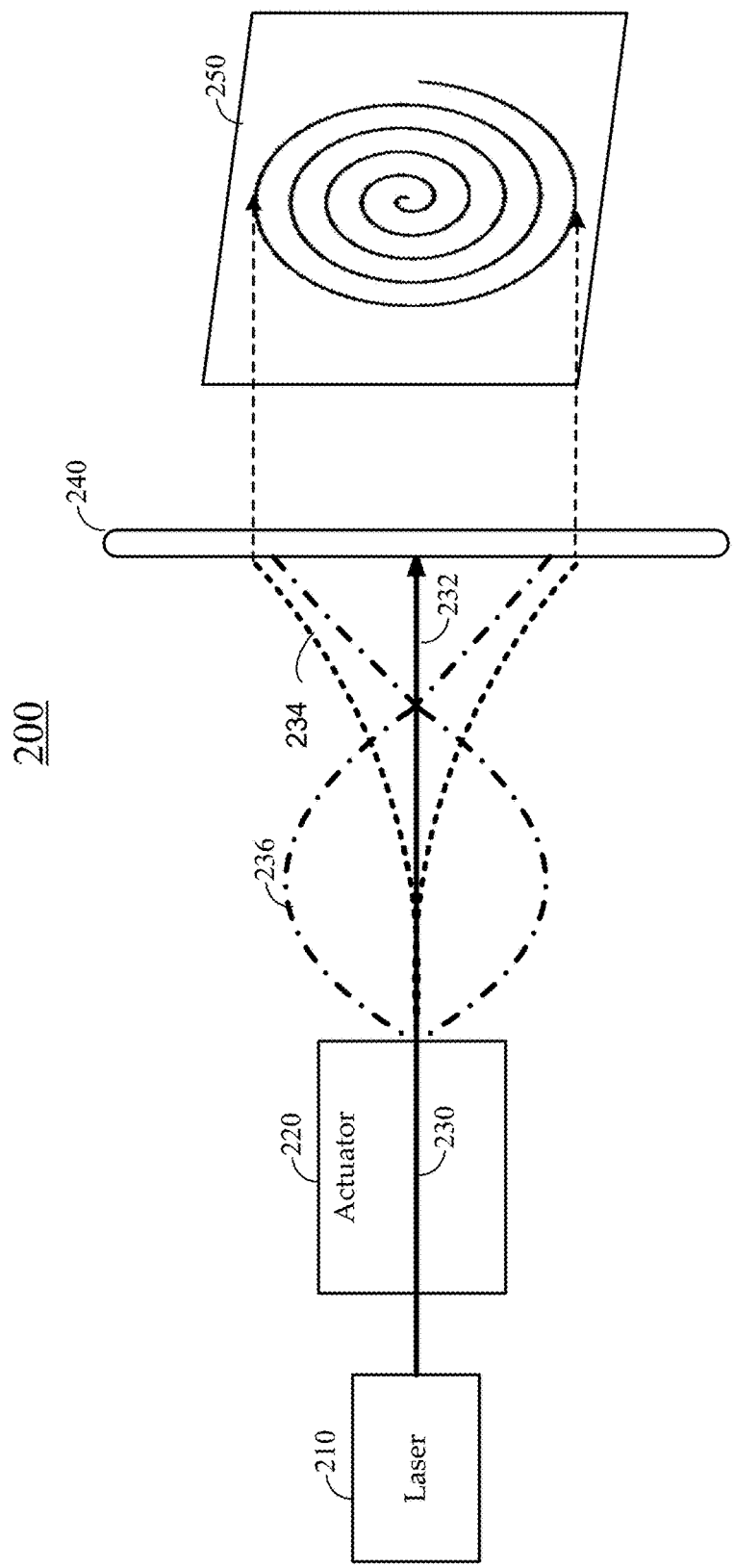
FIG. 2A illustrates an example optical scanning system using a resonant optical fiber.

FIG. 2A illustrates an example optical scanning system 200 using a resonant optical fiber. Optical scanning system 200 may be a LIDAR, LADAR, or other like system. Optical scanning system 200 may include a laser 210, an actuator 220, an optical fiber 230, and a beam shaping device 240, such as a lens or a lens array. Laser 210 may be a light source as described above with respect to optical beam scanner 110 of FIG. 1. Laser 210 may be a pulsed laser such as a mode-locked laser. Laser 210 may also include a modulator that can modulate the output beam of the laser. The output beam of laser 210 is coupled to optical fiber 230, which carries the laser beam and guides it towards beam shaping device 240. Optical fiber 230 may be a single-mode fiber, a multi-mode fiber, or a bundle of fibers. Optical fiber 230 may pass through actuator 220, which may be, for example, a piezoelectric tube or other actuator as described above with respect to FIG. 1. A distal end 232 of optical fiber 230 may extend beyond actuator 220. Distal end 232 of optical fiber 230 extending beyond actuator 220 may be flexible and can withstand a resonant motion caused by actuator 220 to act as a resonant cantilever. The low damping and resonant characteristics of the fiber enable the optical scanning system 200 to amplify a small actuator motion into a large fiber tip displacement. As a result, the laser beam emitted from the vibrating distal end 232 may produce laser beam scanning with a large field of view. The length of distal end 232 can be adjusted to achieve a desired resonant frequency and/or resonant mode. For example, as shown in FIG. 2A, the length of distal end 232 of optical fiber 230 may be adjusted to achieve a resonant mode 234 with a single stationary node close to actuator 220 and a floating end (i.e., distal end 232), or a resonant mode 236 with two stationary nodes and a floating end (i.e., distal end 232).

A 2-D scan pattern can be produced with a single 2-axis actuator and a single fiber. For example, if the 2-axis actuator is controlled by a triangle amplitude-modulated sine wave in the horizontal axis and a triangle amplitude-modulated cosine wave in the vertical axis, an evenly spaced spiral scan pattern may be generated at beam shaping device 240. Beam shaping device 240 may then collimate the beam from distal end 232 of optical fiber 230 and project the collimated beam at a far field 250 to form an evenly spaced spiral scan pattern in far field 250 as shown in FIG. 2A.

In many of these scanning mechanisms, when the laser beam is scanned by the various scanning mechanisms, the scanning angle of the light beam, and thus the incidence angle and the position of the light spot of the light beam on, for example, optical subsystem 130 or beam shaping device 240, may change drastically. This makes it very difficult to design a collimating lens system that can align with and collimate the light beam with a large scanning angle (e.g., greater than about ±10 degrees) to achieve a small angular divergence (e.g., less than about 1 degree).

In addition, in systems in which a fixed single lens is used in optical subsystem 130 or beam shaping device 240, the direction of the refracted light from the lens may change with respect to the refracted light passing through the nodal points of the lens when the incident light crosses the center of the lens. In some systems, a fixed lens array may be used in optical subsystem 130 or beam shaping device 240 to achieve a desired focal length and overall aperture, where a greater angular amplification may also be achieved. However, because of the optical refraction property of the lens, the direction of the light may be changed abruptly when the incident light crosses the boundary between two lenses in the fixed lens array. Thus, the fixed lens or lens array in optical subsystem 130 or beam shaping device 240 may cause the scanning pattern in the far field to be different from the scanning pattern on optical subsystem 130 or beam shaping device 240, and make the reconstruction of the image of the far field more complicated.

Figure 2B:
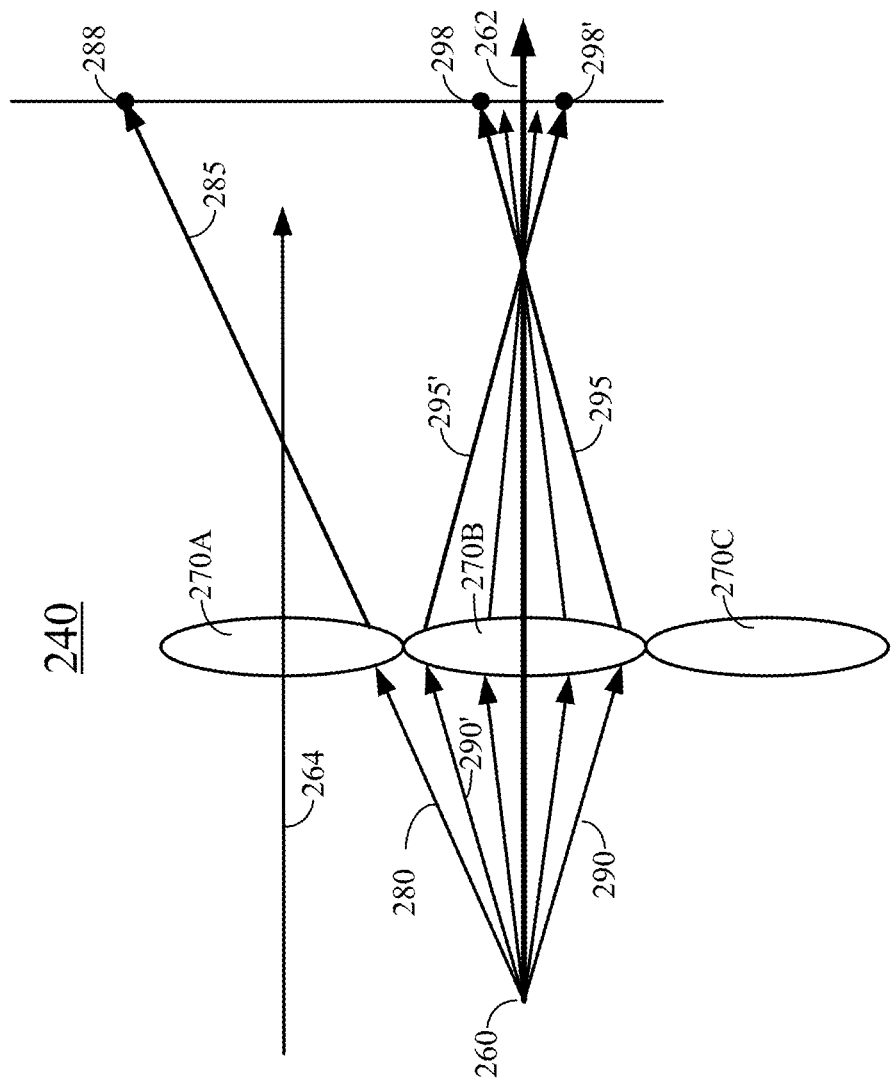
FIG. 2B illustrates a change of direction of the refracted light when an incident light crosses the center of a lens or the boundary between two lenses.

FIG. 2B illustrates the change of direction of the refracted light when the incident light crosses the center of a lens or the boundary between two lenses of beam shaping device 240. As shown in FIG. 2B, a light beam from a light source 260 may be scanned across and irradiate beam shaping device 240. Beam shaping device 240 may include a lens array including, for example, lenses 270A, 270B, and 270C. When a single lens, such as lens 270B, is used, the light beam may irradiate lens 270B as shown by light beam 290 and be directed toward an optical axis 262 of lens 270B as shown by light beam 295. Light beam 295 may illuminate a spot 298 in the far field. When the light beam is scanned upwards from the bottom (light beam 290) to the top (light beam 290') of lens 270B, the illuminated spot in the far field moves downwards from spot 298 to spot 298'. Thus, the moving direction of the light spot in the far field is opposite to the moving direction of the light spot at lens 270B.

When a lens array is used, for example, when the light beam is scanned vertically from the bottom of lens 270B (e.g., light beam 290) to the top of lens 270B (e.g., light beam 290') and then across the boundary between lenses 270B and 270A (e.g., light beam 280), the illuminated spot in the far field may move downwards from spot 298 to spot 298' first, and, when the light beam crosses the boundary between lenses 270B and 270A, the refracted beam may be directed toward an optical axis 264 of lens 270A as shown by light beam 285. As can be seen, light beam 285 and light beam 295' are propagating in very different directions, and the light spot in the far field may jump abruptly from spot 298' to a spot 288. Thus, a discontinuity on the scan pattern in the far field may result when the light beam crosses the boundary between two lenses. As such, the scan pattern in the far field may be significantly different from the scanning pattern on beam shaping device 240, which may make it difficult to reconstruct the image of the far field.

In some implementations of light scanning systems, a reconfigurable collimating lens system may be formed dynamically during the scanning, for example, using an electrical control signal and based on the signal that controls the scanning of the light beam, such that a center of the scanning light beam always passes through the nodal points of the collimating lens, and thus the scanning pattern in the far fields may be similar to the scanning pattern on optical subsystem 130 or beam shaping device 240. However, in many systems, the actual scan pattern (angle) may not follow an ideal scan pattern (angle) as designed. For example, in a LIDAR system using a resonating fiber cantilever, due to the dynamics of the resonating fiber cantilever, the scan pattern may be distorted from the ideal pattern. LIDAR systems using resonant-driven MEMS mirrors may have similar issues. Thus, the exact position and/or incidence angle of the light beam on the reconfigurable collimating lens system at a given time may not be known, making it difficult to dynamically align the reconfigurable collimating lens, or dynamically form the reconfigurable collimating lens that follows the scanning of the light beam such that the reconfigurable collimating lens may align both temporally and spatially with the scanning light beam.

In addition, in many LIDAR systems or other optical scanning systems, it is desirable that the beam scanning element is small (e.g., with an aperture of 100-500 micrometers) such that it can scan fast (e.g., faster than about 100 kHz) and consume less power. In order for the beam scanning element to be small, it is desirable that the size of the beam being scanned is small, which may make it desirable that the collimating lens is located after the beam scanning element, rather than before the beam scanning element. This is because the etendue of a light beam (product of the area of the source and the solid angle that the system's entrance pupil subtends as seen from the source) is conserved as the light beam travels through free space and/or experiences perfect refractions or reflections. In other words, the divergence angle of a laser beam would not be reduced without increasing the beam area. Thus, to reduce the solid angle of the beam divergence by a factor of n (e.g., to collimate the beam), the area of the light spot of the light beam is typically increased by n times or more. If the collimating lens is before the beam scanning element, the size of the collimated beam may be much larger than that of the light beam from the source, and thus a much larger and hence slower beam scanning element may be used. For example, if the collimating lens is located before actuator 220 in FIG. 2A, the light spot of the collimated beam may be significantly larger than the cross-sectional area of the core of optical fiber 230. In such case, the collimated beam could not be carried by optical fiber 230, and a scanning mechanism different from the resonant optical fiber technique described in FIG. 2A may generally be used.

In the case of resonant fibers as shown in FIG. 2A, a gradient-index (GRIN) lens or other micro-lens may be formed on or coupled to, for example, distal end 232 of optical fiber 230 that is after the beam scanning element (i.e., actuator 220) for collimating the light beam from optical fiber 230. However, the GRIN lens or other micro-lens may affect the resonant characteristics of the resonant fiber because, for example, the GRIN lens or other micro-lens may be too heavy or too bulky compared with the optical fiber.

For at least the above reasons, it is desirable to have a collimating lens that is positioned after a beam scanning element and can automatically align with and change position with a scanning light beam to collimate the scanning light beam at large scanning angles while achieving small angular divergence in a LIDAR or other optical scanning system.

II. Self-Aligning Optical Systems

Figure 3:
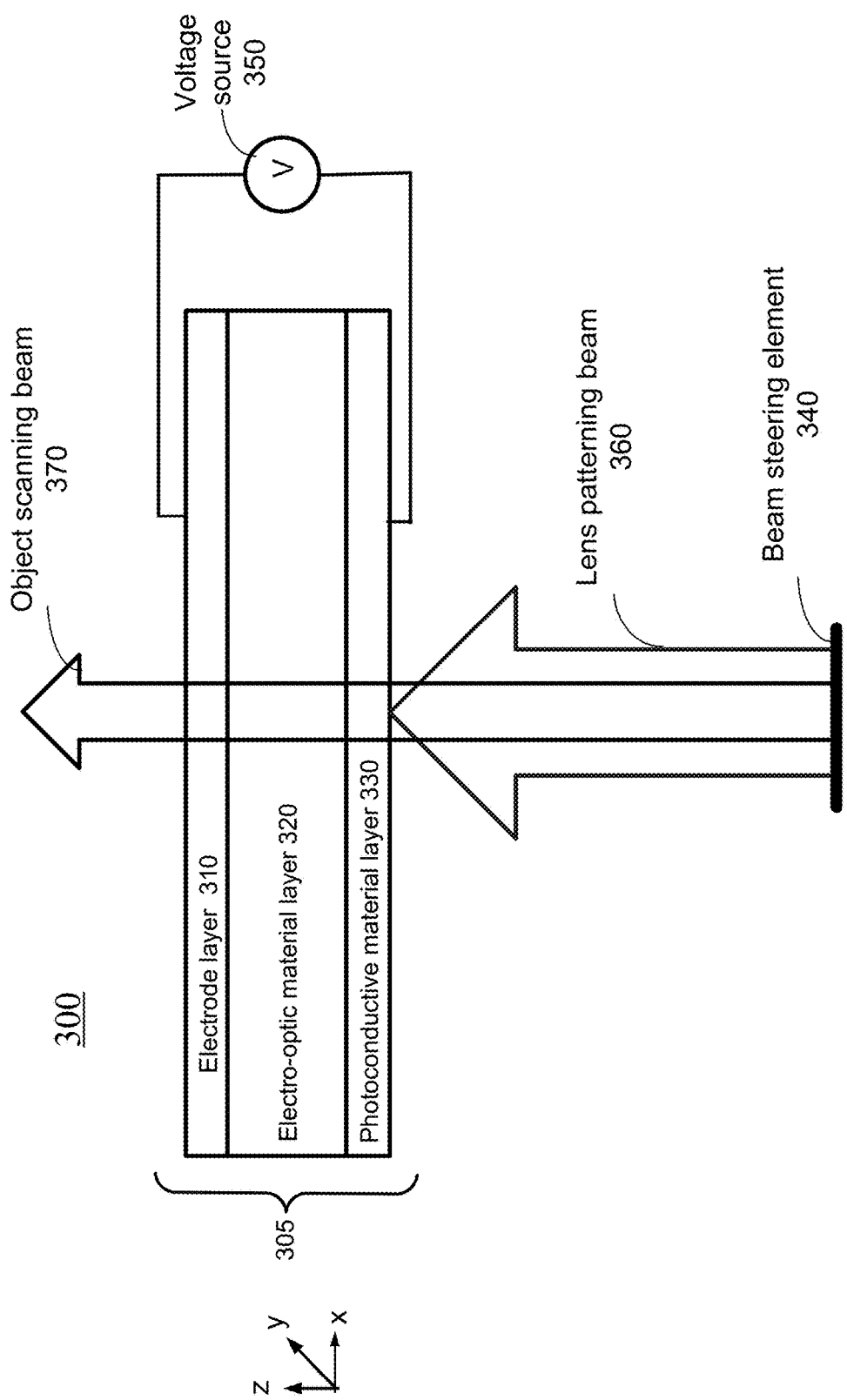
FIG. 3 illustrates an example self-aligning collimating system, according to some aspects of the present disclosure.

FIG. 3 illustrates an example self-aligning collimating system 300, according to some aspects of the present disclosure. Self-aligning collimating system 300 incudes a reconfigurable device 305, in which a reconfigurable collimating lens whose shape and location can be aligned both temporally and spatially with a scanning light beam may be formed. Reconfigurable device 305 may include an electrode layer 310, an EO material layer 320, and a photoconductive material layer 330 arranged in a stack, which may be referred to as a travelling lens stack. A voltage signal may be applied to reconfigurable device 305 by a voltage source 350 coupled to electrode layer 310 and photoconductive material layer 330 to generate an electric field within EO material layer 320. To form the reconfigurable self-aligning collimating lens, a lens patterning beam 360 may be combined with and be steered together with an object scanning beam 370 (for object scanning) by a beam steering element 340. Lens patterning beam 360 may form the self-aligning lens in an area within reconfigurable device 305 that is illuminated by lens patterning beam 360 due to the interaction between lens patterning beam 360, photoconductive material layer 330, and EO material layer 320 of reconfigurable device 305 as described in detail below. Lens patterning beam 360 may have a beam spot as large as or larger than a beam spot of object scanning beam 370. Furthermore, the center of lens patterning beam 360 may be aligned with the center of object scanning beam 370 as shown in FIG. 3. Thus, the aperture of the formed collimating lens may be equal to or larger than the beam spot of object scanning beam 370, and object scanning beam 370 may be centered on the center of the formed collimating lens.

Figure 4:
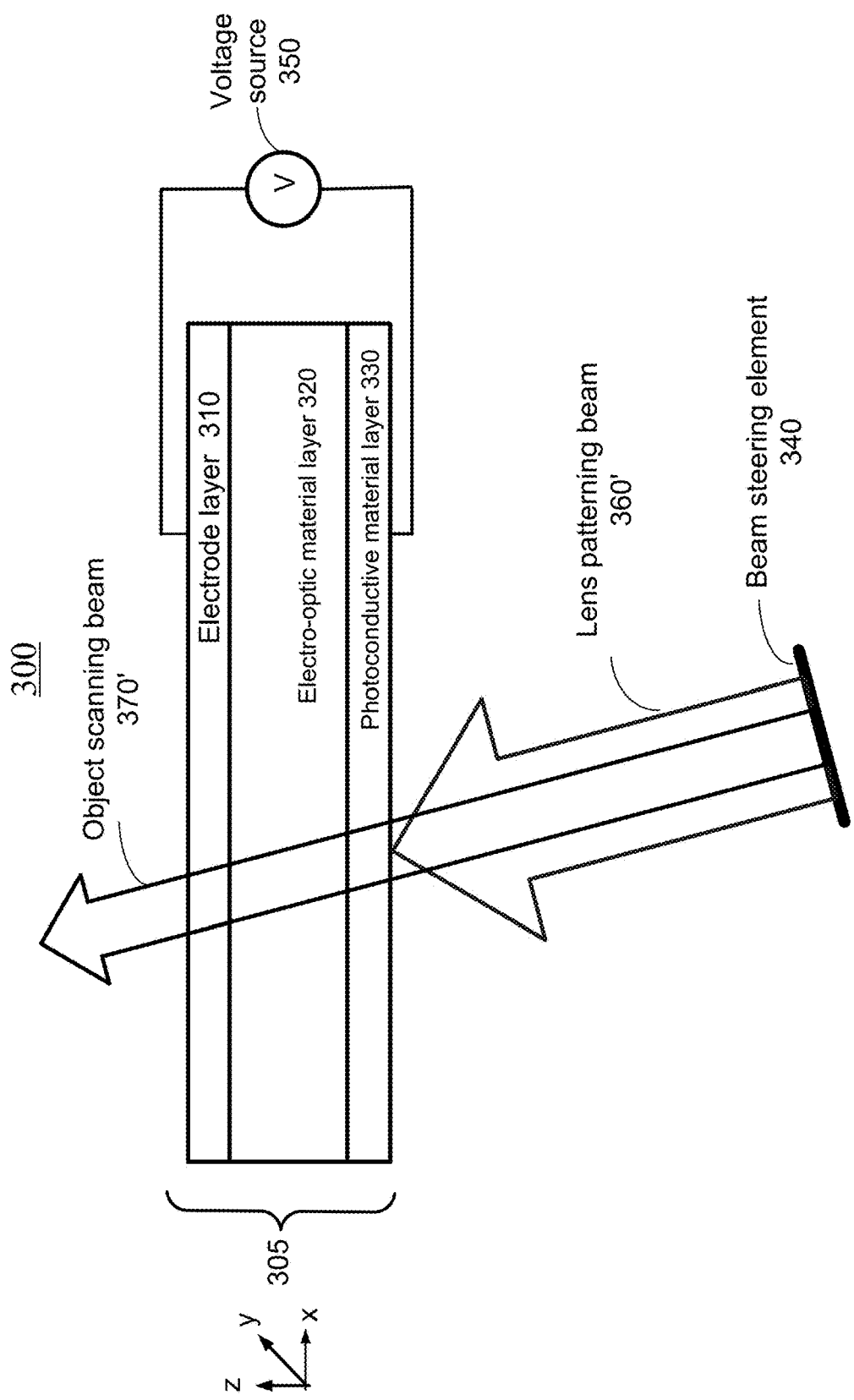
FIG. 4 illustrates an example self-aligning collimating system where a collimating lens travels with an object scanning beam, according to some aspects of the present disclosure.

FIG. 4 illustrates an example self-aligning collimating system 400 where a collimating lens travels with an object scanning beam 370', according to some aspects of the present disclosure. As shown in FIG. 4, beam steering element 340 may scan a lens patterning beam 360' and object scanning beam 370' that are aligned and combined, according to a desired scanning pattern. As lens patterning beam 360' and object scanning beam 370' are scanned at different scanning angles, lens patterning beam 360' may illuminate a different area on reconfigurable device 305 at a time, and a self-aligning collimating lens may be formed in the illuminated area, which may collimate object scanning beam 370' that is centered on the center of the formed collimating lens as described above. Because lens patterning beam 360 (or 360') and object scanning beam 370 (or 370') are aligned, combined, and scanned together, the formed collimating lens inherently aligns with and travels with the object scanning beam at any scanning angle.

In self-aligning collimating system 300, lens patterning beam 360 and object scanning beam 370 may have different wavelengths. According to one embodiment, object scanning beam 370 has a wavelength longer than the wavelength of lens patterning beam 360, i.e., a photon energy of object scanning beam 370 is less than the photo energy of lens patterning beam 360. Photoconductive material layer 330 may have a bandgap larger than the photon energy of object scanning beam 370 and thus is transparent to object scanning beam 370. At the same time, photoconductive material layer 330 may have a bandgap smaller than the photon energy of lens patterning beam 360 and thus may absorb photons from lens patterning beam 360. EO material layer 320 and electrode layer 310 may be substantially transparent to object scanning beam 370, and may or may not be transparent to lens patterning beam 360. In some implementations, reconfigurable device 305 may be configured such that electrode layer 310 and EO material layer 320 may reflect the unabsorbed portion of lens patterning beam 360 back to photoconductive material layer 330. In some embodiment, the travelling lens stack may form at least a part of a cavity for lens patterning beam 360 such that, once lens patterning beam 360 enters the cavity, it may be confined within the cavity. The impedance of photoconductive material layer 330 may change upon absorbing photons from lens patterning beam 360 due to, for example, extra free-moving carriers generated by the absorbed photons from lens patterning beam 360.

Electrode layer 310 may include a transparent conducting film (TCF) that is electrically conductive and optically transparent to object scanning beam 370. The TCF may include, for example, an indium tin oxide (ITO) film as used in liquid-crystal displays, OLEDs, touchscreens, and photovoltaic devices. Other TCFs, such as other transparent conductive oxides (TCOs), conductive polymers, metal grids, carbon nanotubes (CNT), graphene, nanowire meshes, and ultra-thin metal films may be used for electrode layer 310. For example, TCOs such as fluorine doped tin oxide (FTO) or doped zinc oxide may be used. As another example, organic films developed using carbon nanotube networks and graphene may be fabricated to be highly transparent to infrared light, along with networks of polymers such as poly (3,4-ethylenedioxythiophene) and its derivatives.

EO material layer 320 may include an EO material whose refractive index in the "z" direction can change in response to a change in an electric field applied within EO material layer 320. When a voltage signal V is applied between electrode layer 310 and photoconductive material layer 330 as shown in FIG. 4, the applied voltage signal V may drop across EO material layer 320 and photoconductive material layer 330 in proportion to the magnitudes of their respective impedances, at the frequency of the applied voltage signal V if the applied voltage signal V is an alternating current (AC) signal. The electric field generated within EO material layer 320 may be determined by the voltage drop across EO material layer 320 divided by the thickness of EO material layer 320. When the impedance of photoconductive material layer 330 is much higher than the impedance of EO material layer 320, most of the applied voltage signal will drop within the photoconductive material, and thus the electric field within the EO material layer 320 may be small. When the impedance of photoconductive material layer 330 is much lower than the impedance of EO material layer 320, most of the applied voltage signal may drop across EO material layer 320, and thus, the electric field within EO material layer 320 may be much larger, such as approximately equal to the applied voltage signal V.

Therefore, when no lens patterning beam or a uniform patterning beam illuminates reconfigurable device 305, the impedance of photoconductive material layer 330 may be uniform across different areas along the "x" direction. As such, the electrical voltage drop and the electric field generated within EO material layer 320 in the "z" direction may also be uniform across different areas along the "x" direction. Thus, the refractive index of EO material layer 320 may be uniform along the "x" direction, and no lens is formed because the thickness of EO material layer 320 is uniform along the "x" direction as well.

Figure 5A:
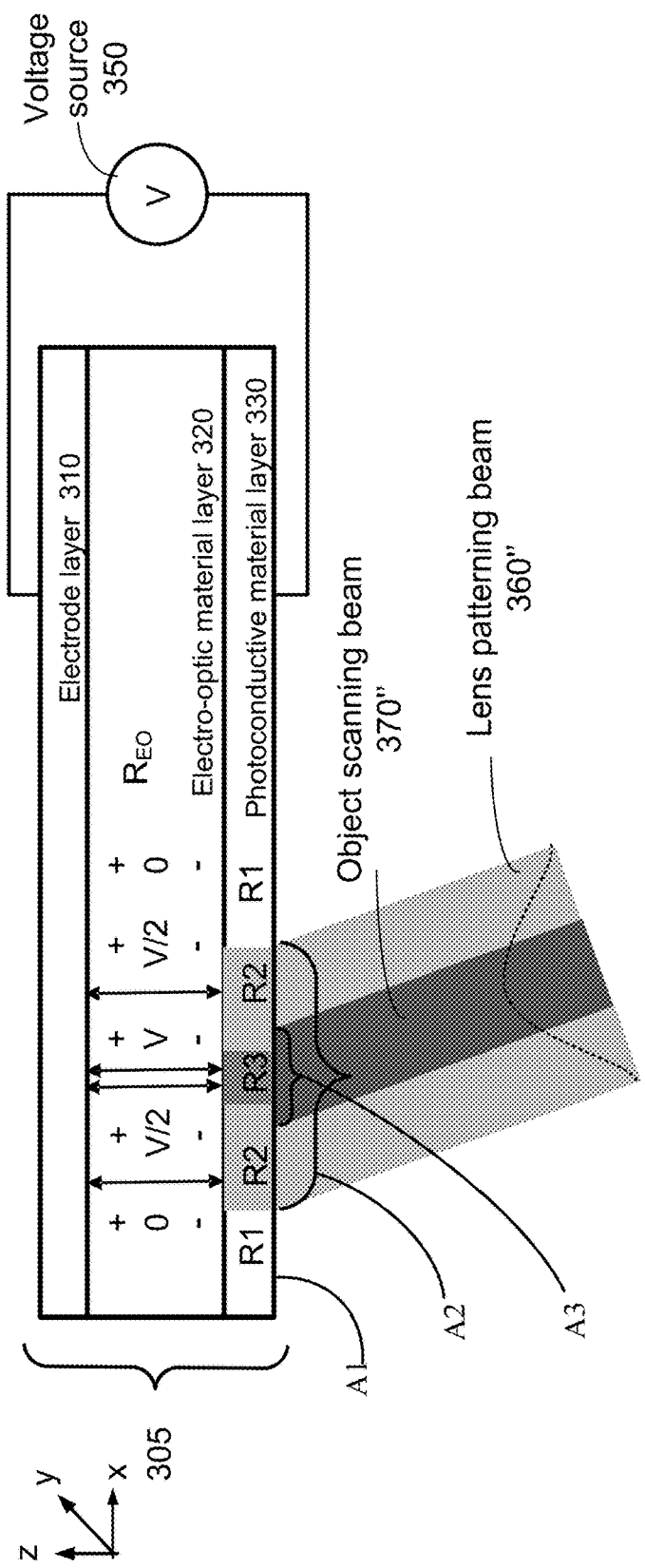
FIG. 5A illustrates a formation of an example self-aligning collimating lens in an example self-aligning collimating system, according to some aspects of the present disclosure.

FIG. 5A illustrates a formation of an example self-aligning collimating lens in reconfigurable device 305, according to some aspects of the present disclosure. As shown in FIG. 5A, a lens patterning beam 360" may be directed to reconfigurable device 305 at, for example, an area A2, and an object scanning beam 370" may be directed to reconfigurable device 305 at an area A3, which is at the center of area A2. Area A1 may not be illuminated by lens patterning beam 360".

The impedance of photoconductive material layer 330 may be spatially modulated by lens patterning beam 360" according to the intensity profile of lens patterning beam 360". Area A1 of photoconductive material layer 330 may have an impedance of R1. Area A2 of photoconductive material layer 330 where the lens patterning beam is incident may have a reduction in its impedance as a function of the intensity pattern of lens patterning beam 360", due to the creation of free charge carriers when the photoconductive material in photoconductive material layer 330 absorbs photons from lens patterning beam 360". For example, if the intensity of lens patterning beam 360" has a Gaussian distribution in its beam spot, the center of area A2 may have an impedance R3 lower than an impedance R2 of the peripheral regions of area A2. For example, compared with an impedance $R_{EO}$ of EO material layer 320, R1 in unilluminated area A1 may be much greater than $R_{EO}$ (e.g., at least 10 times higher), R2 may be approximately equal to $R_{EO}$, and R3 may be much lower than $R_{EO}$. In various embodiments, the light spot of lens patterning beam 360" may have a light intensity profile corresponding to the desired phase (i.e., wave-front) profile of the collimating lens or any other optical component to be formed, and the impedance profile of area A2 may inversely correspond to the light intensity profile of the lens patterning beam and/or the desired phase profile of the optical component to be formed. The exact light intensity profile of lens patterning beam 360" may be determined based on, for example, the desired phase profile of the optical component to be formed, the EO coefficient of the EO material, and/or the photoconductivity of the photoconductive material.

Figure 5C:
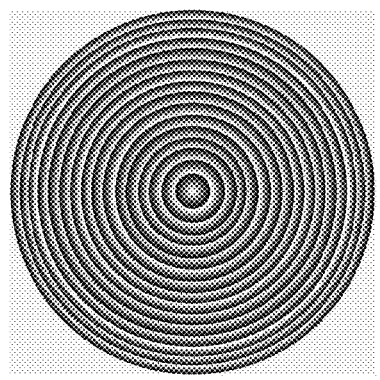
FIG. 5C illustrates an example illumination pattern that has an intensity profile corresponding to a Fresnel lens, according to some aspects of the present disclosure.
Figure 5E:
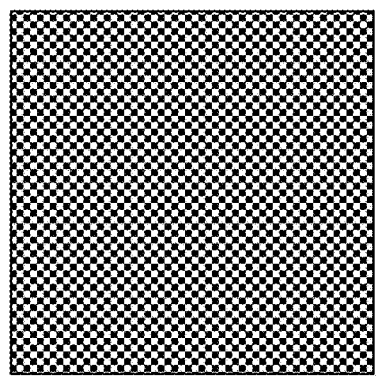
FIG. 5E illustrates an example illumination pattern that has an intensity profile corresponding to a hologram, according to some aspects of the present disclosure.
Figure 5B:
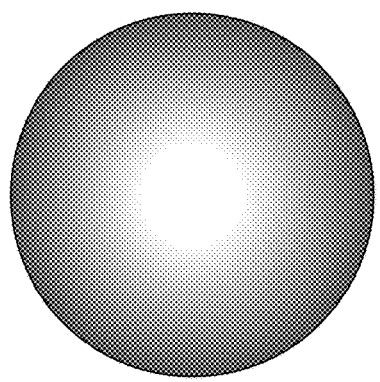
FIG. 5B illustrates an example illumination pattern that has an intensity profile corresponding to a convex lens, according to some aspects of the present disclosure.

FIG. 5B illustrates an example illumination pattern 510 that has an intensity profile corresponding to a refractive lens, according to some aspects of the present disclosure. As shown in FIG. 5B, the light intensity of illumination pattern 510 gradually reduces from the center to the edge of illumination pattern 510. The exact intensity profile of illumination pattern 510 may be determined based on, for example, the desired focal length of the refractive lens and/or the desired aperture of the refractive lens, which may be used to determine the phase profile of the refractive lens. For example, the gradient of the intensity change of illumination pattern 510 may be determined based on the desired focal length of the lens.

A lens patterning beam with a light intensity profile illustrated by illumination pattern 510 may cause a change in the impedance profile of the photoconductive material layer 330. As a result of the spatial modulation of the impedance profile of the photoconductive material layer 330 according to the light intensity profile of the lens patterning beam, the voltage drop within EO material layer 320 in different regions of EO material layer 320 changes accordingly. For example, in area A1 where impedance R1 of photoconductive material layer 330 is much greater than $R_{EO}$, the voltage drop in EO material layer 320 is close to zero. In area A2 where impedance R2 is approximately equal to $R_{EO}$, the voltage drop in EO material layer 320 is approximately one half of the applied voltage signal V. In area A3 where impedance R3 is much lower than $R_{EO}$, the voltage drop in EO material layer 320 is approximately equal to the applied voltage signal V. The different changes in voltage drop in different areas of EO material layer 320 may cause different changes in electrical field. As such, the electric field within EO material layer 320 is also spatially modulated according to the intensity profile of lens patterning beam 360″. The spatial modulation of the electric field within EO material layer 320 may cause different changes in refractive index in different areas of EO material layer 320 due to the EO characteristics of EO material, and thus spatially modulate the refractive index in EO material layer 320. For example, in area A3 where the voltage drop in EO material layer 320 increases to a maximum value of V, the electric field may increase to a strongest level, and the refractive index may increase to a highest value as well. The electric field within EO material layer 320 and the refractive index of EO material layer 320 may reduce gradually in a radially outward direction from area A3 toward area A1, that is, being spatially modulated. As such, the optical lengths (physical length times the refractive index) in different areas of EO material layer 320 may resemble the optical length (or phase) profile of a lens to form a collimating lens at the location where lens patterning beam 360″ falls on reconfigurable device 305.

FIG. 5C illustrates an example illumination pattern 520 that has an intensity profile corresponding to a Fresnel lens, according to some aspects of the present disclosure. A Fresnel lens formed by illumination pattern 520 may achieve the functions of the refractive lens described above with respect to FIGS. 5A and 5B with a refractive index change that is lower than the refractive index change used to form the refractive lens described above with respect to FIGS. 5A and 5B, and thus may use an EO material with a lower EO coefficient, a thinner EO material layer, and/or a lower voltage signal applied to the stack.

A person skilled in the art would appreciate that even though the cross-sectional view of FIGS. 3-5 illustrates reconfigurable device 305 as extending in the "x" direction, reconfigurable device 305 and lens patterning beams 360, 360', and 360″ may extend in both the "x" and "y" directions. Furthermore, even though lens patterning beam 360, 360', or 360″ and object scanning beam 370, 370', or 370″ are shown to be steered by a same beam steering element 340, the lens patterning beam and object scanning beam may be steered by two beam steering elements that are synchronized to each other or coordinated by a common control element. In addition, even though the lens patterning beam and the object scanning beam are shown to be co-axially aligned at any given time, the lens patterning beam and the object scanning beam may be separated by a certain angle (depending on the response times of the photoconductive material and the EO material) with the lens patterning beam traveling ahead of the object scanning beam to compensate for the response time delay of the materials. Also, reconfigurable device 305 in FIGS. 3-5 may be flipped in the "z" direction such that the lens patterning beam and the object scanning beam may reach electrode layer 310 first, so long as EO material layer 320 and electrode layer 310 are substantially transparent to the lens patterning beam.

FIGS. 3-5 illustrate simplified structures of example self-aligning collimating systems. In various implementations, the self-aligning collimating system may include additional or alternative structural elements. Furthermore, in various embodiments, self-aligning travelling optical components other than a centered convex spherical lens as discussed above may be formed when patterning beams with different intensity profiles are used. For example, in some implementations, a concave lens may be formed using a patterning beam with a higher light intensity on the edge of the patterning beam compared with the light intensity in the center of the patterning beam. In some implementations, an aspherical lens may be formed. In some implementations, a decentered lens may be formed. In some implementations, self-aligning travelling optical components other than a lens may be formed.

Figure 5D:
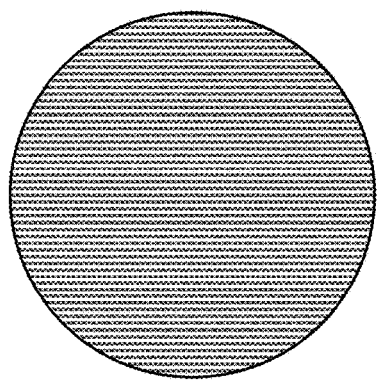
FIG. 5D illustrates an example illumination pattern that has an intensity profile corresponding to a grating, according to some aspects of the present disclosure.

FIG. 5D illustrates an example illumination pattern 530 that has an intensity profile corresponding to a grating, according to some aspects of the present disclosure. The grating may include, for example, a square, sine, triangle, or sawtooth grating with desired period and/or duty cycle.

FIG. 5E illustrates an example illumination pattern 540 that has an intensity profile corresponding to a hologram, according to some aspects of the present disclosure. For example, the intensity profile of illumination pattern 540 may correspond to a holographic optical element can correct the wave front of a laser beam to generate a diffraction-free beam. In some implementations, the intensity profile of illumination pattern 540 may correspond to a holographic optical element that can be used as an optical splitter or fan-out component to generate multiple optical beams arranged in a one-dimensional array or a two-dimensional matrix or any other desired pattern, such that multiple points in the far field may be scanned in parallel using a single laser source. In various implementations, the intensity profile of illumination pattern 540 may be generated using a mask that is designed using computer-generated holographic (CGH) techniques. It is noted that, as shown in FIG. 5E, in various embodiments, the beam spot or illumination pattern of a patterning beam may have an aperture with a shape different from a circle, such as a square, a rectangle, an oval, or any other shape.

One skilled in the relevant art will appreciate that the disclosed illustrative self-aligning travelling optical components are not meant to be an exhaustive identification of all possible components that may be formed using techniques disclosed herein. Rather, illustrative components have been identified, in a non-limiting manner, to facilitate illustration of one or more aspects of the present disclosure. For example, in some embodiments, the techniques disclosed herein may be used for optical transformation or optical information/image processing, rather than optical beam scanning.

FIG. 6A illustrates an example self-aligning collimating system 600, according to some aspects of the present disclosure. In FIG. 6A, the self-aligning collimating system includes an object scanning light source 610 for generating an object scanning beam 612, such as object scanning beams 370, 370', and 370″ in FIGS. 3-5. Self-aligning collimating system 600 may also include a lens patterning light source 620 and a beam intensity modulator, such as a beam intensity pattern mask 630, for generating a lens patterning beam 632, such as lens patterning beams 360, 360', and 360″ in FIGS. 3-5. Object scanning light source 610 and lens patterning light source 620 may emit laser beam at different wavelengths. In some embodiments, both object scanning light source 610 and lens patterning light source 620 may generated pulsed laser beams. In some other embodiments, lens patterning light source 620 may generate a continuous wave (CW) laser beam. Beam intensity pattern mask 630 may include a light intensity filter or light intensity modulator to generate a lens patterning beam with a desired intensity profile on the beam spot. The light intensity filter or light intensity modulator may have a light intensity modulation function corresponding to a phase profile of a lens. Lens patterning beam 632 may be directed to a beam combiner 640, which may combine lens patterning beam 632 with object scanning beam 612. Beam combiner 640 may include a beam directing device 642, such as a mirror, for directing object scanning beam 612 towards a bulky beam combiner 644, such as a polarization beam combiner, a prism, a diffraction grating, a dichroic mirror, or a volume Bragg grating. The combined lens patterning beam 632 and object scanning beam 612 may be steered by an actuator 650 and directed to a reconfigurable device 660, such as reconfigurable device 305 of FIGS. 3-5.

FIG. 6B illustrates another example self-aligning collimating system 670, according to some aspects of the present disclosure. Some components of self-aligning collimating system 670 in FIG. 6B may be similar to corresponding components in self-aligning collimating system 600 in FIG. 6A. For example, self-aligning collimating system 670 may include an object scanning light source 672 similar to object scanning light source 610 of FIG. 6A, and a lens patterning light source 680 similar to lens patterning light source 620 of FIG. 6A. Lens patterning beam from lens patterning light source 680 may be filtered or modulated by a beam intensity modulator, such as a beam intensity pattern mask 682, which may be similar to beam intensity pattern mask 630 of FIG. 6A. In FIG. 6B, a lens patterning beam 684 filtered by beam intensity pattern mask 682 and an object scanning beam 674 from object scanning light source 672 may be coupled to optical fibers, and a fiber-optic beam combiner 690 may be used to combine lens patterning beam 684 with object scanning beam 674 and guide the combined beam through an actuator 692 that actuates a resonant fiber to direct the combined beam to different locations on a reconfigurable device 694 according to a desired scan pattern.

III. Example Self-Aligning Traveling Collimating Lenses

FIGS. 3-5 illustrate simplified structures of example reconfigurable devices. However, in various implementations, the reconfigurable device may be of different stackups and/or may include additional or alternative layers.

Figure 7:
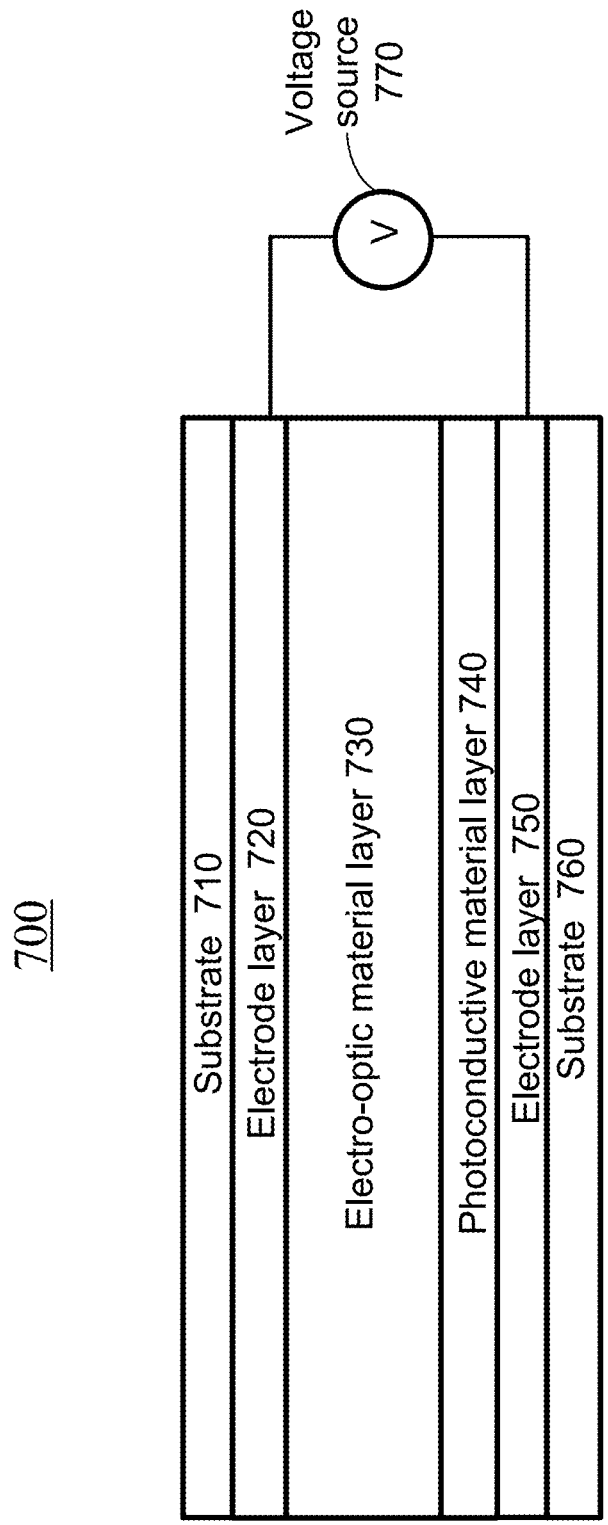
FIG. 7 illustrates an example reconfigurable device for forming self-aligning collimating lenses, according to some aspects of the present disclosure.

FIG. 7 illustrates an example reconfigurable device 700 for forming self-aligning collimating lenses, according to some aspects of the present disclosure. Reconfigurable device 700 may include an electrode layer 720 formed on a substrate 710 for applying a voltage signal to reconfigurable device 700. For example, substrate 710 may include a polyethylene terephthalate (PET) film sheet and electrode layer 720 may include a transparent conducting film, such as ITO. Reconfigurable device 700 may include an EO material layer 730, which may be similar to EO material layer 320 described above, and a photoconductive material layer 740, which may be similar to photoconductive material layer 330 described above with respect to FIGS. 3-5. In some embodiments, photoconductive material layer 740 may also be used as a second electrode for applying the voltage signal to the reconfigurable device 700. In some embodiments, reconfigurable device 700 may further include a second electrode layer 750 formed on a second substrate 760, as described above with respect to electrode layer 720 and substrate 710. Second electrode layer 750 may have a low impedance to maintain a substantially equal potential in different regions on the bottom surface of photoconductive material layer 740. Electrode layers 720 and 750 (or photoconductive material layer 740) may be coupled to a voltage source 770 for applying the voltage signal to reconfigurable device 700.

Figure 8:
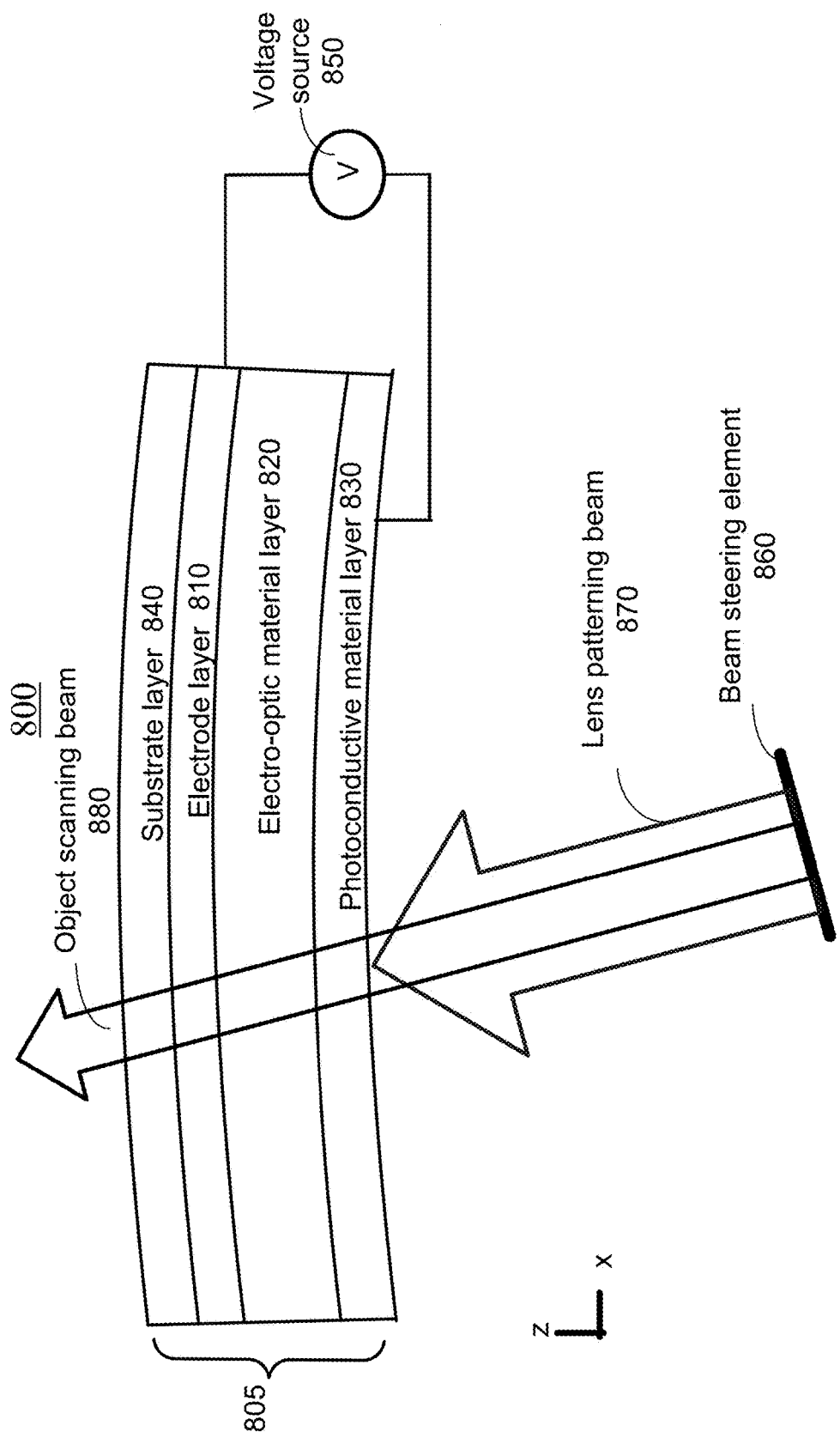
FIG. 8 illustrates an example reconfigurable device in a self-aligning collimating system, according to some aspects of the present disclosure.

FIG. 8 illustrates an example reconfigurable device 805 in a self-aligning collimating system 800, according to some aspects of the present disclosure. Similar to reconfigurable device 305 of FIGS. 3-5, reconfigurable device 805 may include an electrode layer 810, an EO material layer 820, and a photoconductive material layer 830. Reconfigurable device 805 may include a substrate layer 840 on which electrode layer 810 may be formed. Substrate layer 840 may include a curve-shaped glass substrate or a flexible plastic substrate, such as a polyimide, polyether ether ketone (PEEK), transparent conductive polyester, or polyethylene terephthalate (PET) film. Substrate layer 840 may have a spherical surface such that a constant distance may be maintained between the formed self-aligning collimating lens and a pivotal point of a beam steering element 860 (e.g., the stationary node of the resonant scanning fiber as shown in FIG. 2A) when beam steering element 860 scans a lens patterning beam 870 and an object scanning beam 880. In some embodiments, substrate layer 840 may have a non-spherical curvature designed to correct aberrations of the system. A voltage source 850 may be coupled to electrode layer 810 and photoconductive material layer 830. In some embodiments, as in FIG. 7, a high conductive second electrode layer may be formed on or attached to photoconductive material layer 830 to maintain an equal potential on the bottom surface of photoconductive material layer 830.

Figure 9:
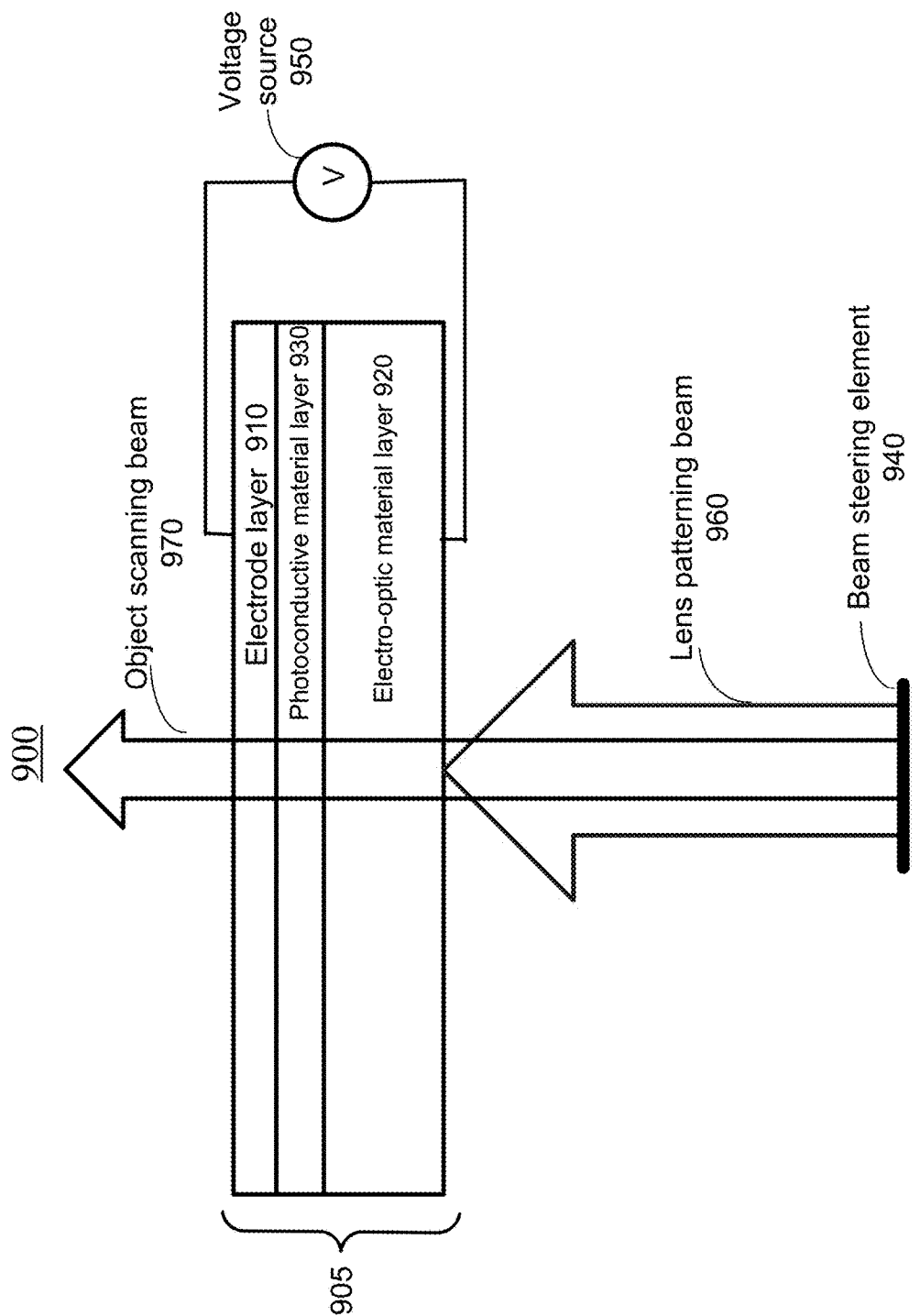
FIG. 9 illustrates an example reconfigurable device in a self-aligning collimating system, according to some aspects of the present disclosure.

FIG. 9 illustrates an example reconfigurable device 905 in a self-aligning collimating system 900, according to some aspects of the present disclosure. Similar to reconfigurable device 305 of FIGS. 3-5, reconfigurable device 905 includes an electrode layer 910, an EO material layer 920, and a photoconductive material layer 930. In reconfigurable device 905, photoconductive material layer 930 may be positioned between electrode layer 910 and EO material layer 920 so long as EO material layer 920 is substantially transparent to a lens patterning beam 960. A voltage source 950 may be coupled to electrode layer 910 and EO material layer 920. In some embodiments, the refractive indexes of electrode layer 910, EO material layer 920, and photoconductive material layer 930 may be configured such that lens patterning beam 960 may be confined within photoconductive material layer 930 by electrode layer 910 and EO material layer 920. In some embodiments, as in FIG. 7, a second electrode layer may be attached to EO material layer 920 and coupled to voltage source 950. A beam steering element 940 may be used to steering lens patterning beam 960 and an object scanning beam 970 toward reconfigurable device 905 to form a self-aligning collimating lens for collimating object scanning beam 970.

Figure 10:
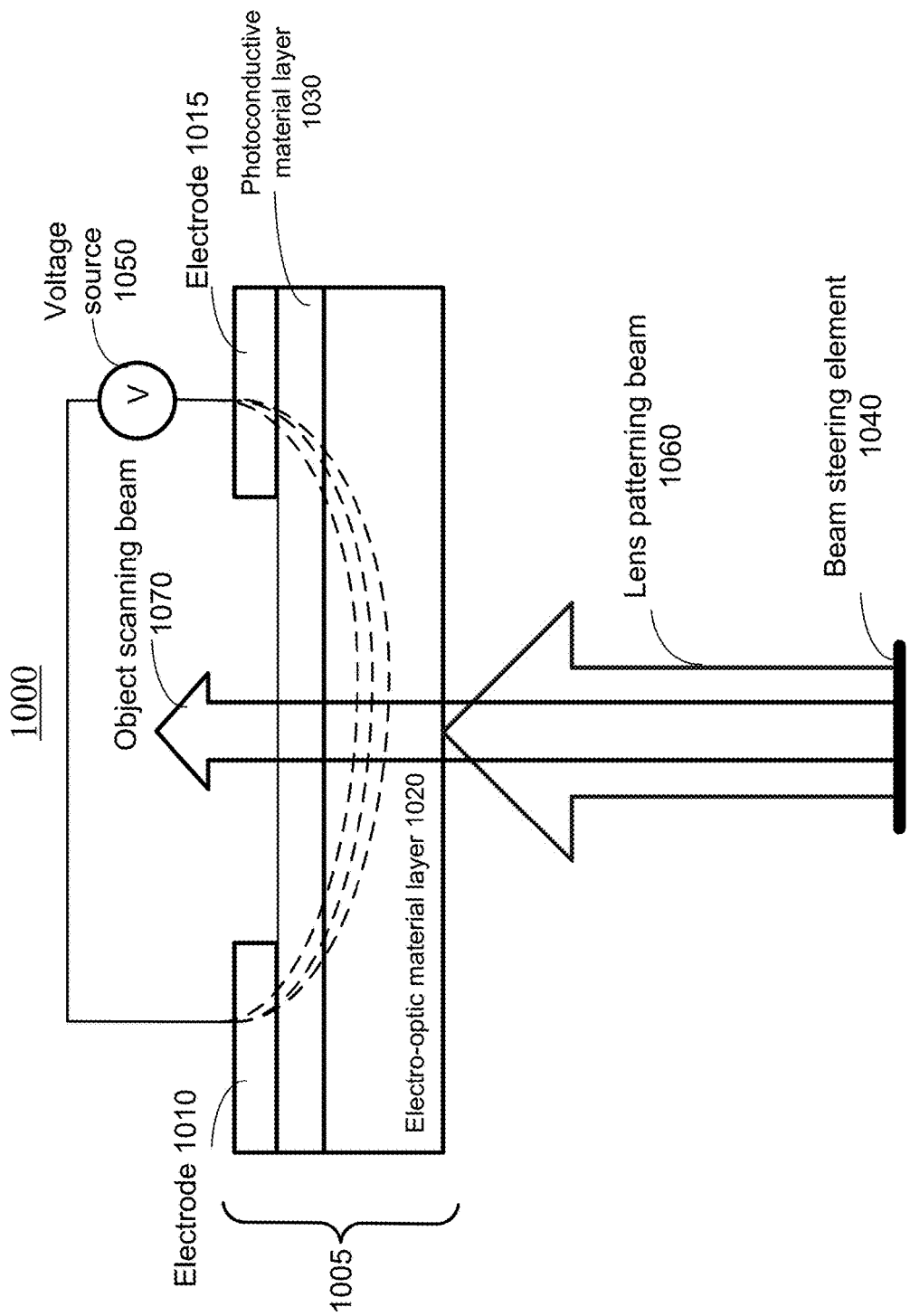
FIG. 10 illustrates an example reconfigurable device in a self-aligning collimating system, according to some aspects of the present disclosure.

FIG. 10 illustrates an example reconfigurable device 1005 in a self-aligning collimating system 1000, according to some aspects of the present disclosure. In FIG. 10, reconfigurable device 1005 may have a structure similar to in-plane-switching for liquid crystal display (LCD) where the applied electrical field is orthogonal to the beam propagation direction, rather than in the same direction as the beam propagation direction as shown in FIGS. 3-5 and 8-9 above. Reconfigurable device 1005 may include an EO material layer 1020 and a photoconductive material layer 1030 arranged in a stack. An electrode 1010 and an electrode 1015 may be formed on an electrode layer on one side of EO material layer 1020 or photoconductive material layer 1030, but in opposite areas on the electrode layer, as shown in FIG. 10. When a voltage signal V is applied between electrode 1010 and electrode 1015 by a voltage source 1050, a substantially horizontal electrical field may be formed within EO material layer 1020 as shown in FIG. 10. A beam steering element 1040 may direct a lens patterning beam 1060 and an object scanning beam 1070 towards reconfigurable device 1005. Lens patterning beam 1060 may change the impedance of photoconductive material layer 1030 and thus the voltage drop, electric field, and refractive index within EO material layer 1020 to form a desired optical component in EO material layer 1020 as described above. It is noted that, in some embodiments of reconfigurable device 1005, object scanning beam 1070 may not pass through electrode 1010 or electrode 1015, and thus electrode 1010 and electrode 1015 may use a conductive material that is not transparent to object scanning beam 1070. It is also noted that FIG. 10 is not drawn in scale. In various embodiments, the dimensions and relative locations of the components in FIG. 10 may be adjusted as desired. Additionally, it is understood that while the embodiment is illustrated with photoconductive material layer 1030 disposed between the electrode layer and EO material layer 1020, photoconductive material layer 1030 can also be disposed on a side of EO material layer 1020 opposite the patterned electrode layer of electrodes 1010 and 1015.

IV. Photoconductive Materials

In various embodiments, a variety of photoconductive materials may be used. In general, any photoconductive material that is transparent to the object scanning beam, but can absorb the lens patterning beam and change conductivity according to the intensity of the lens patterning beam may be used.

In one example, a gallium nitride (GaN) material or any material having a bandgap corresponding to a wavelength below, for example, 500 nm, may be used. For example, a GaN material may have a bandgap of 3.39 eV, which corresponds to about 365 nm in wavelength. The lens patterning beam may be a violet or an ultraviolet light beam having a wavelength shorter than 365 nm. The object scanning beam may be a visible light beam (e.g., 550 nm (green) or 650 nm (red)), a near infrared light beam (e.g., 850 nm, 940 nm, etc.), or a light beam having an even longer wavelength.

In another example, a silicon material having a bandgap of about 1.12 eV (corresponding to about 1100 nm in wavelength) may be used. The silicon material may include a layer of undoped hydrogenated amorphous silicon (a-Si:H) and a layer of highly doped n-type amorphous silicon (n+ a-Si:H). The lens patterning beam may be, for example, visible or near infrared, and the wavelength of the object scanning beam may be, for example, typical wavelengths used for telecommunications (e.g., about 1300 nm or about 1550 nm).

In yet another example, a phthalocyanine material may be used. The phthalocyanine material may be a titanium oxide phthalocyanine thin film. The lens patterning beam may be, for example, red or near infrared, such as within a range of about 550-850 nm, and the wavelength of the object scanning beam may be, for example, near infrared, but at a longer wavelength (e.g., about 940 nm).

In some implementations, negative photoconductive materials that exhibit reduction in photoconductivity when exposed to illumination may be used. Negative photoconductive materials may include, for example, molybdenum trisulfide, graphene, and metal nanoparticles.

V. EO Materials

Any configuration (including an EO material with a given refractive index and a given EO coefficient, an EO material layer thickness, and an applied voltage) capable of inducing a significant refractive index change (e.g., greater than 0.0001) may be used as the EO material layer for the reconfigurable device. It is understood that for a given EO material that exhibits a Pockets effect or a Kerr effect with a given EO coefficient, the EO material layer thickness and the applied voltage can be adjusted to induce the desired refractive index change. However, given some practical considerations, EO materials with EO coefficients that allow for a device having an EO material layer thickness between 10 to 100 microns and an applied voltage of less than 500 volts, or less than 100 volts, may be advantageous over other EO materials. The refractive index change may be along an axis parallel to the applied electric field or orthogonal to the applied electric field, as described above. In any case, the refractive index change would be along the propagation direction of the object scanning beam.

A variety of EO polymers and EO crystals may be used as the EO material in, for example, EO material layer 320 of FIGS. 3-5A and corresponding EO material layers of FIGS. 7-10. For example, a sol-gel based EO material with an EO coefficient (γ33) of about 1190 pm/V and a refractive index of about 1.621 as disclosed by Liu et al. may be used. See, e.g., Liu, Jialei, et al., "Recent advances in polymer EO modulators," *Rsc Advances* 5.21 (2015): 15784-15794. In such a sol-gel based implementation, for an EO material layer with a thickness of 100 microns and an applied voltage of 350 volts, the change in refractive index L n may be given by:

$$\Delta n \approx -rE\frac{n^3}{2} \approx -9 \times 10^{-3},$$

where r is the EO coefficient of the EO material, E is the electric field within the EO material layer, and n is the refractive index of the EO material. If the wavelength of the object scanning beam is near infrared or visible, such refractive index change may cause a phase shift of greater than one wavelength after propagating through the 100-micron EO material layer, which may be large enough to alter the wave front of the object scanning beam for collimating.

As described above with respect to FIG. 10, it is possible to pattern electrodes similar to in-plane-switching for LCDs, where the applied electric field and the crystals are aligned horizontally (orthogonal to the beam propagation direction) rather than vertically. For example, some crystal materials, such as $BaTiO_3$, may have a large γ51 EO coefficient (e.g., 1650 pm/V) that is not a diagonal component of the EO tensor, and may be used as the EO material in a reconfigurable device as shown in FIG. 10. See, e.g., Christopher C. Davis, "Lasers and EOs: Fundamentals and Engineering," Cambridge University Press, ISBN 978-0-521-48403-9 (May 2, 1996).

In various embodiments, EO materials having a positive or a negative EO coefficient may be used, and the light intensities of the lens patterning beam may be modulated accordingly based on the EO coefficient of the EO material used.

VI. Example Methods

Figure 11A:
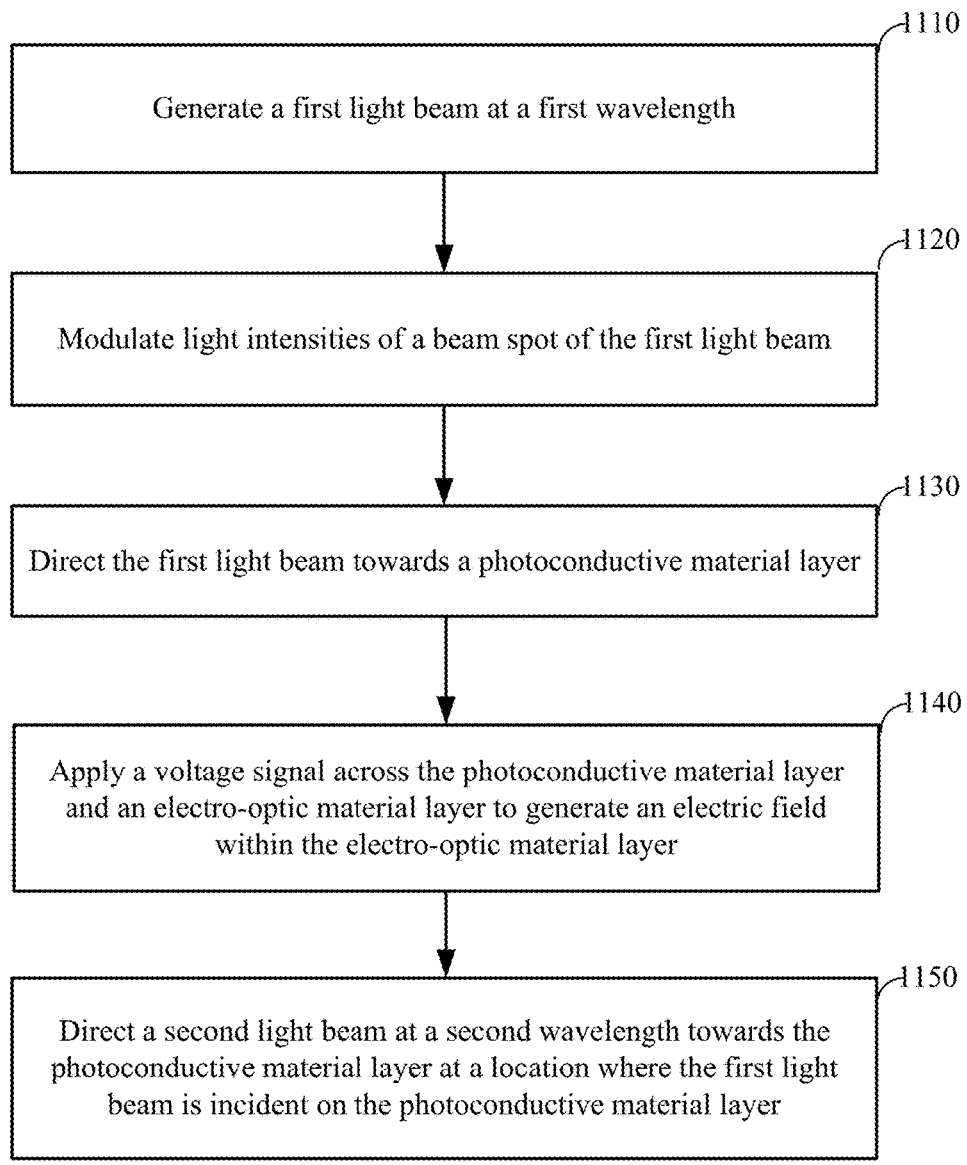
FIG. 11A is a flow chart illustrating an example method for dynamically forming of a self-aligning collimating lens, according to some aspects of the present disclosure.

FIG. 11A is a flow chart 1100 illustrating an example method for dynamically forming a self-aligning collimating lens, according to some aspects of the present disclosure. At block 1110, a first light beam at a first wavelength for lens patterning may be generated by, for example, lens patterning light source 620 of FIG. 6A. The first light beam may include a pulsed laser beam or a continuous wave laser beam. The first wavelength may be any wavelength that is shorter than a threshold wavelength of a photoconductive material.

Optionally, at block 1120, the light intensities on the beam spot of the first light beam may be modulated by, for example, beam intensity pattern mask 630 of FIG. 6A. The light intensities on the beam spot may correspond to a phase profile of a desired optical component, such as a lens. In some embodiments, the first light beam generated by the lens patterning light source may be a Gaussian beam whose beam intensity profile may approximately match the phase profile of the desired optical component (e.g., a lens). In such cases, the operation at block 1120 may be omitted.

At block 1130, the first light beam may be directed towards a photoconductive material layer by a beam steering element, such as beam steering element 340, actuator 650, or beam steering element 860, 940 or 1040. The photoconductive material layer may be sensitive to light at the first wavelength and may absorb the first light beam propagating through the photoconductive material layer as described above in this disclosure. The first light beam may cause changes in the impedance of the photoconductive material layer according to an illumination pattern (i.e., the light intensities of the beam spot) of the first light beam as described above with respect to FIG. 5A. For example, the impedance of the photoconductive material layer may be spatially modulated according to an illumination pattern that has an intensity profile corresponding to a lens, a Fresnel lens, a grating, a hologram, etc., as shown in FIGS. 5B-5E.

At block 1140, a voltage signal may be applied across the photoconductive material layer and an EO material layer by a voltage source, such as voltage source 350, 770, 850, 950, or 1050. The voltage signal may generate an electric field within the EO material layer. The strength of the electric field may be a function of the thickness of the EO material layer and the voltage drop within the EO material layer, where the voltage drop within the EO material layer depends on the applied voltage signal and the ratio between the magnitude of the impedance of the photoconductive material layer and the magnitude of the impedance of the EO material layer (i.e., a voltage divider). The EO material layer is capable of a localized change in refractive index in the presence of an electric field. The changes in the impedance of the photoconductive material layer according to the illumination pattern of the first light beam as described above with respect to block 1130 may spatially modulate the voltage drop and thus the electric field in the EO material layer according to the illumination pattern of the first light beam, which may, in turn, cause changes in the refractive index of the EO material layer to form the desired optical component, such as a collimating lens. For example, as described above with respect to FIGS. 5A and 5B, the electric field within EO material layer 320 and the refractive index of EO material layer 320 may be spatially modulated according to the illumination pattern shown in FIG. 5B such that the electric field and the refractive index may reduce gradually in a radially outward direction from area A3 toward area A1.

At block 1150, a second light beam at a second wavelength may be directed by a beam steering element as described above in this disclosure towards the photoconductive material layer at the location where the first light beam is incident on the photoconductive material layer and where the desired optical component is formed. The optical component may then process (e.g., collimate) the second light beam as designed. The photoconductive material layer and the EO material layer may be transparent to the second light beam such that the second light beam may propagate through the photoconductive material layer and the EO material layer, and be transmitted towards a target object.

Figure 11B:
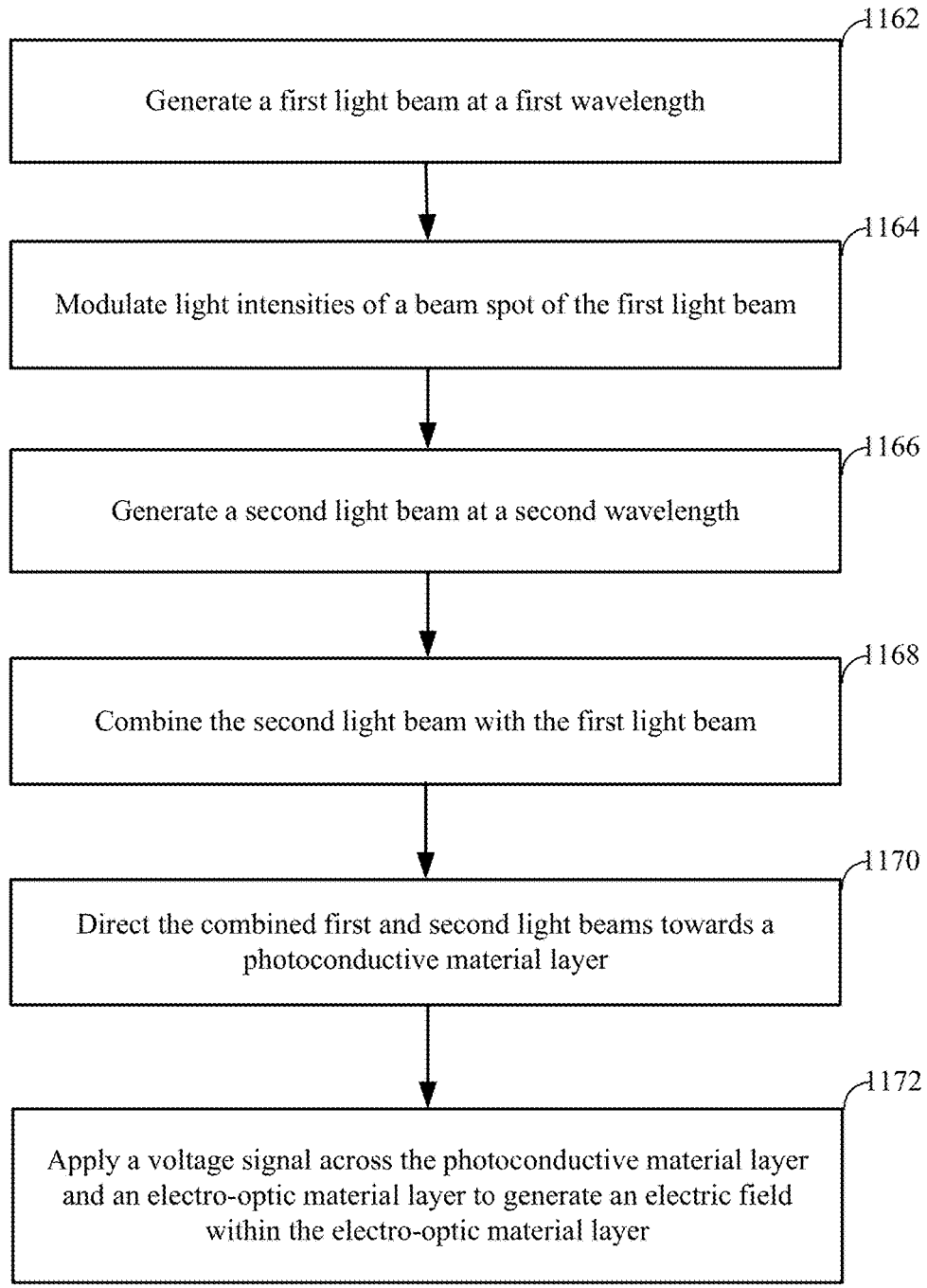
FIG. 11B is a flow chart illustrating an example method for dynamically forming of a self-aligning collimating lens, according to some aspects of the present disclosure.

FIG. 11B is a flow chart 1160 illustrating an example method for dynamically forming a self-aligning collimating lens, according to some aspects of the present disclosure. At block 1162, a first light beam at a first wavelength for lens patterning may be generated, for example, by lens patterning light source 620 of FIG. 6A. The first light beam may include a pulsed laser beam or a continuous wave laser beam. The first wavelength may be any wavelength that is shorter than a threshold wavelength of a photoconductive material.

At block 1164, the illumination pattern (i.e., the light intensities on the beam spot) of the first light beam may be modulated by, for example, beam intensity pattern mask 630 of FIG. 6A. The light intensities on the beam spot may correspond to a phase profile of a desired optical component, such as a lens. In some embodiments, the first light beam generated by the lens patterning light source may be a Gaussian beam, the beam intensity profile of which may approximately match the phase profile of the desired optical component (e.g., a lens). In such cases, the operation at block 1164 may be omitted.

At block 1166, a second light beam at a second wavelength may be generated by, for example, object scanning light source 610 of FIG. 6A. The second light beam may include a pulsed laser beam or a continuous wave laser beam. The second wavelength may be longer than the first wavelength and the threshold wavelength of the photoconductive material. The second light beam may pass through the photoconductive material layer, a transparent electrode layer, and an EO material layer of the self-aligning collimating lens with a low loss, such as less than 10%, 5%, 2%, 1% or less.

At block 1168, the first light beam and the second light beam may be combined by a beam combiner, such as beam combiner 640 of FIG. 6A or fiber beam combiner 640' of FIG. 6B as described above, to generate a combined light beam.

At block 1170, the combined light beam including the first light beam and the second light beam may be directed by a beam steering element, such as beam steering element 340, actuator 650, or beam steering element 860, 940 or 1040, towards the photoconductive material layer at different locations according to a desired scan pattern. The photoconductive material layer may be sensitive to light at the first wavelength and absorb the first light beam propagating through the photoconductive material layer as described above in this disclosure. The first light beam may spatially modulate the impedance of the photoconductive material layer according to the light intensities on the beam spot of the first light beam, as described above with respect to FIGS. 5A-5E.

At block 1172, a voltage signal may be applied across the photoconductive material layer and the EO material layer by a voltage source, such as voltage source 350, 770, 850, 950, or 1050. The voltage signal may generate an electric field within the EO material layer. The strength of the electric field may be a function of the thickness of the EO material layer and the voltage drop within the EO material layer, where the voltage drop within the EO material layer depends on the applied voltage signal and the ratio between the magnitude of the impedance of the photoconductive material layer and the magnitude of the impedance of the EO material layer (i.e., a voltage divider). The EO material layer is capable of a localized change in refractive index in the presence of an electric field. The spatial modulation of the impedance of the photoconductive material layer according to the light intensities of the beam spot of the first light beam as described above in block 1170 may cause a spatial modulation of the voltage drop and thus the electric field in the EO material layer according to the light intensities of the beam spot of the first light beam, which may, in turn, induce localized changes in refractive index of the EO material layer to form the desired optical component, such as a collimating lens. The optical component may then process the second light beam as designed. For example, a collimating lens formed by the techniques disclosed herein may collimate the second light beam and transmit it towards a target object.

It is noted that even though FIGS. 11A and 11B describe the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations described at another block. Furthermore, embodiments of the methods may be implemented in hardware, software, firmware, middleware, microcode, hardware description languages, or any combination thereof.

Figure 11C:
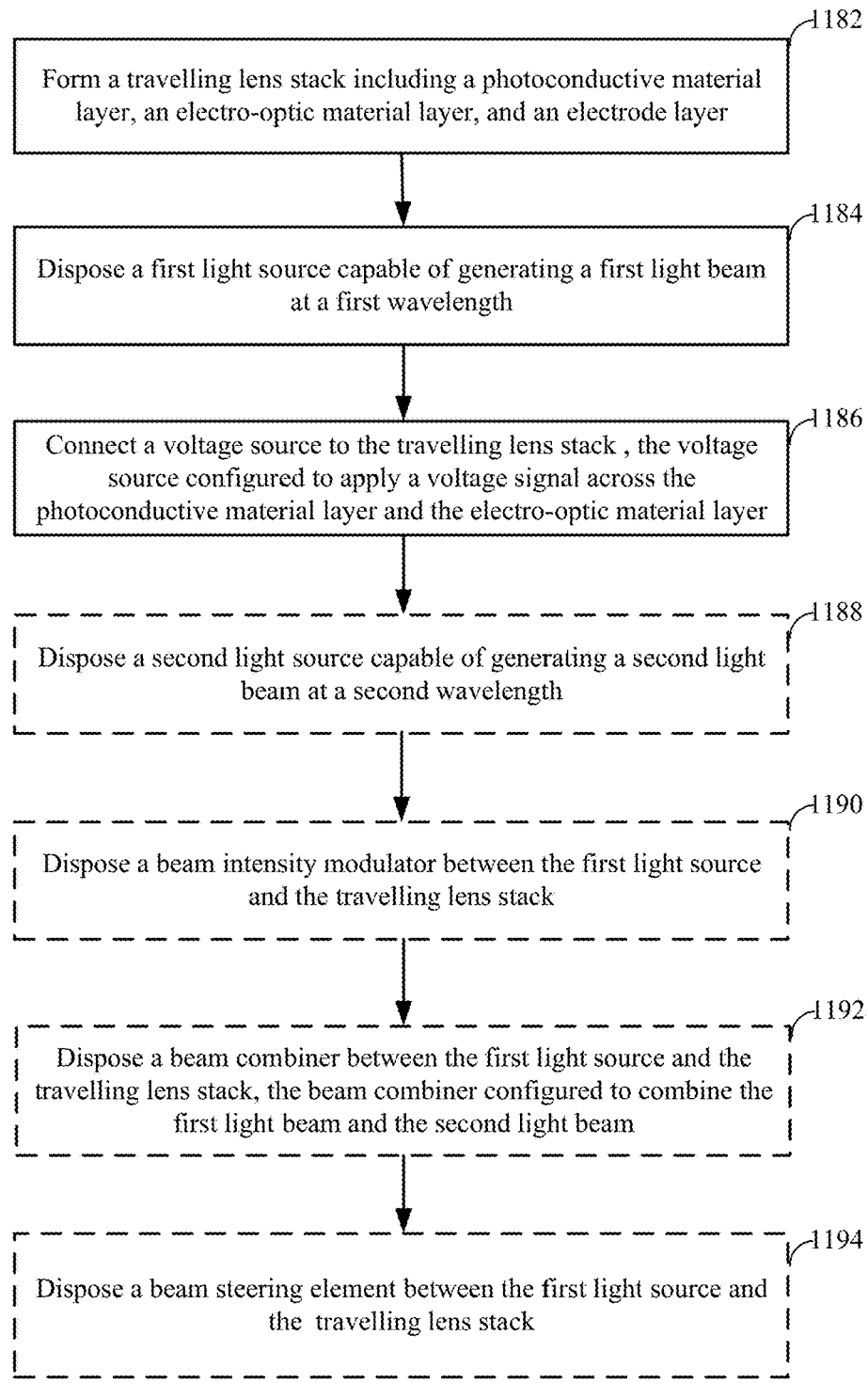
FIG. 11C is a flow chart illustrating an example method for making a self-aligning optical component, according to some aspects of the present disclosure.

FIG. 11C is a flow chart 1180 illustrating an example method for making a self-aligning optical component, such as a collimating lens, according to some aspects of the present disclosure. At block 1182, a travelling lens stack including a photoconductive material layer, an electro-optic material layer, and an electrode layer may be formed. In some embodiments, the travelling lens stack may be formed by forming a photoconductive material layer (e.g., on a flat or curved substrate), forming an electro-optic material layer on the photoconductive material layer, and then forming an electrode layer on a side of the electro-optic material layer that is opposite to the photoconductive material layer. In some embodiments, an electro-optic material layer may be formed first, a photoconductive material layer may be formed on the electro-optic material layer, and an electrode layer may be formed on a side of the electro-optic material layer that is opposite to the photoconductive material layer. In some embodiments, the travelling lens stack may be formed by forming a photoconductive material layer, forming an electro-optic material layer on the photoconductive material layer, and then forming an electrode layer on a side of the photoconductive material layer that is opposite to the electro-optic material layer. In some embodiments, the travelling lens stack may be formed by forming an electro-optic material layer (e.g., on a curved or flat substrate), forming a photoconductive material layer on the electro-optic material layer, and then forming an electrode layer on the photoconductive material layer.

At block 1184, a first light source capable of generating a first light beam (lens patterning beam) at a first wavelength may be disposed relative to the photoconductive material layer to enable the first light source to direct the first light beam towards the photoconductive material layer. The first light source may be disposed as shown in FIGS. 3, 4, 6A, 6B, and 8-10. The first light source may be a laser of any suitable wavelength that the photoconductive material layer is sensitive to.

At block 1186, a voltage source may be connected to the travelling lens stack to apply a voltage signal across the photoconductive material layer and the electro-optic material layer. As shown in FIGS. 3, 4, 5, and 7-10, in various implementations, the voltage signal may be connected to the electrode layer and the photoconductive material layer, connected to the electrode layer and the electro-optic material layer, connected to two electrode layers on opposite sides of the electro-optic material layer and the photoconductive material layer, or connected to a patterned electrode layer on the same side of the electro-optic material layer and/or the photoconductive material layer. As such, changes in the impedance of the photoconductive material layer according to the light intensities of the beam spot of the first light beam may modulate the electric field within the electro-optic material layer, thus causing a localized change in refractive index of the electro-optic material layer induced by the modulated electric field to form the self-aligning optical component (e.g., a collimating lens) in the electro-optic material layer.

Optionally, at block 1188, a second light source capable of generating a second light beam (object scanning light beam) at a second wavelength may be disposed as shown in, for example, FIGS. 3, 4, 6A, 6B, and 8-10. The second light source may be oriented relative to the photoconductive material layer to enable the second light source to direct the second light beam towards the photoconductive material layer at a location where the first light beam is incident on the photoconductive material layer. The photoconductive material layer and the electro-optic material layer may be transparent to the second light beam. In some embodiments, the first light source and the second light source may be a same light source, such as a dual-wavelength or dual-frequency laser, for example, a birefringence-based solid-state or optical fiber dual-wavelength or dual-frequency laser.

Optionally, at block 1190, a beam intensity modulator, such as a beam intensity pattern mask, may be disposed between the first light source and the travelling lens stack, as shown in, for example, FIGS. 6A and 6B. The beam intensity pattern mask may be used to modulate the first light beam to generate a desired illumination pattern, such as an illumination pattern that has an intensity profile corresponding to a convex lens, a concave lens, a Fresnel lens, a grating, a hologram, etc., as described above with respect to FIGS. 5B-5E.

Optionally, at block 1192, a beam combiner may be disposed between the first light source and the travelling lens stack as shown in, for example, FIGS. 6A and 6B. The beam combiner may be configured to combine the first light beam and the second light beam into a single light beam that includes light of different wavelengths. In some embodiments, the beam combiner may be a bulky beam combiner, such as a polarization beam combiner, a prism, a diffraction grating, a dichroic mirror, or a volume Bragg grating. In some embodiments, the beam combiner may be a fiber-optic beam combiner.

Optionally, at block 1194, a beam steering element may be disposed between the first light source and the travelling lens stack, for example, between the beam combiner and the photoconductive material layer of the travelling lens stack. The beam steering element may be configured to direct the first light beam and/or the second light beam towards the photoconductive material layer. As described above, the beam steering element may include any of many different types of laser beam scanning elements, for example, a multi-dimensional mechanical stage, a Galvo-controlled mirror, a MEMS mirror driven by micro-motors, a piezoelectric translator/transducer using piezoelectric materials), an electromagnetic actuator, an acoustic actuator, or a resonant fiber actuator.

VII. Example Computing Systems

Figure 12:
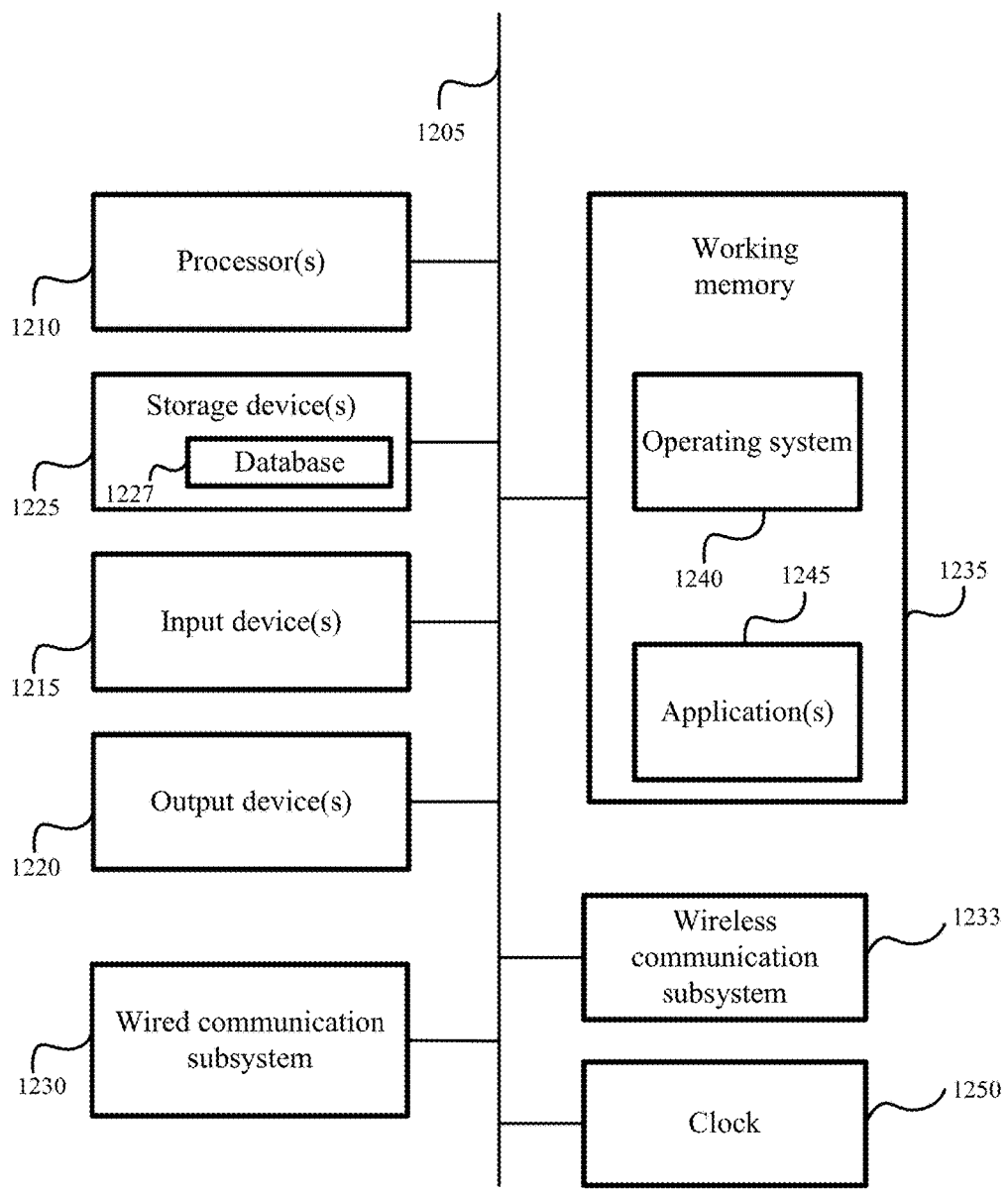
FIG. 12 is a block diagram of an example computing system for implementing some of the examples described herein.

FIG. 12 illustrates components of an example computing system 1200 for implementing some of the examples described herein. For example, computing system 1200 can be used to control optical beam scanner 110 of FIG. 1, laser 210 and actuator 220 of FIG. 2A, beam steering element 340 of FIGS. 3-5, actuator 650 or 692 of FIG. 6A or 6B, or beam steering element 860, 940, or 1040. It should be noted that FIG. 12 is meant only to provide a generalized illustration of various components, any or all of which may be utilized as appropriate. Moreover, system elements may be implemented in a relatively separated or relatively more integrated manner.

Computing system 1200 is shown comprising hardware elements that can be electrically coupled via a bus 1205 (or may otherwise be in communication, as appropriate). The hardware elements may include processor(s) 1210, one or more input devices 1215, and one or more output devices 1220. Input device(s) 1215 can include without limitation camera(s), a touchscreen, a touch pad, microphone(s), a keyboard, a mouse, button(s), dial(s), switch(es), and/or the like. Output devices 1220 may include without limitation a display device, a printer, LEDs, speakers, and/or the like.

Processor(s) 1210 may include without limitation one or more general-purpose processors, one or more special-purpose processors (such as digital signal processing (DSP) chips, graphics acceleration processors, application-specific integrated circuits (ASICs), and/or the like), and/or other processing structures or means, which can be configured to perform one or more of the methods described herein, such as determining a ToF of a laser pulse.

Computing system 1200 can also include a wired communication subsystem 1230 and a wireless communication subsystem 1233. Wired communication subsystem 1230 and wireless communication subsystem 1233 can include, without limitation, a modem, a network interface (wireless, wired, both, or other combination thereof), an infrared communication device, a wireless communication device, and/or a chipset (such as a Bluetooth™ device, an International Electrical and Electronics Engineers (IEEE) 802.11 device, e.g., a device utilizing one or more of the IEEE 802.11 standards described herein), a WiFi device, a WiMax device, cellular communication facilities, etc.), and/or the like. Subcomponents of the network interface may vary, depending on the type of computing system 1200. Wired communication subsystem 1230 and wireless communication subsystem 1233 may include one or more input and/or output communication interfaces to permit data to be exchanged with a data network, wireless access points, other computer systems, and/or any other devices described herein.

Depending on desired functionality, wireless communication subsystem 1233 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN.

Computing system 1200 of FIG. 12 may include a clock 1250 on bus 1205, which can generate a signal to synchronize the various components on bus 1205. Clock 1250 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other devices while performing the techniques described herein.

Computing system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including, without limitation, various file systems, database structures, and/or the like. For instance, storage device(s) 1225 may include a database 1227 (or other data structure) configured to store detected signals, calibration results, and the pre-determined or calibrated relationship among laser beam steering signals and locations or scanning angles of the lens patterning beam and/or object scanning beam, as described in embodiments herein.

In many embodiments, computing system 1200 may further comprise a working memory 1235, which can include a RAM or ROM device, as described above. Software elements, shown as being currently located within working memory 1235, can include an operating system 1240, device drivers, executable libraries, and/or other code, such as one or more application programs 1245, which may comprise software programs provided by various embodiments, and/or may be designed to implement methods, and/or configure systems, provided by other embodiments, as described herein, such as some or all of the methods described in relation to FIGS. 11A and 11B. Merely by way of example, one or more procedures described with respect to the method discussed above might be implemented as code and/or instructions executable by a computer (and/or a processor within a computer). In an aspect, such code and/or instructions can be used to configure and/or adapt a general-purpose computer (or other device) to perform one or more operations in accordance with the described methods.

A set of these instructions and/or code might be stored on a non-transitory computer-readable storage medium, such as non-transitory storage device(s) 1225 described above. In some cases, the storage medium might be incorporated within a computer system, such as computing system 1200. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 1200 and/or might take the form of source and/or installable code, which, upon compilation and/or installation on computing system 1200 (e.g., using any of a variety of generally available compilers, installation programs, compression/decompression utilities, etc.), then takes the form of executable code.

It will be apparent to those skilled in the art that substantial variations may be made in accordance with particular implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A system comprising:
    an electrode layer transparent to at least one wavelength of light;
    an electro-optic material layer, the electro-optic material layer being transparent at the at least one wavelength of light;
    a photoconductive material layer, the photoconductive material layer being transparent at the at least one wavelength of light and sensitive to light of a second wavelength; and
    a first light source configured to generate a first light beam of the second wavelength that is characterized by an intensity profile,
    wherein the electrode layer, the electro-optic material layer, and the photoconductive material layer are arranged in a stack, the photoconductive material layer configured to, in response to receiving the first light beam, spatially modulate an electric field within the electro-optic material layer and cause the electro-optic material layer to form an optical lens for the at least one wavelength of light based on a localized change in refractive index induced by the spatially modulated electric field, wherein a phase profile of the optical lens corresponds to the intensity profile of the first light beam of the second wavelength.

2. The system of claim 1, wherein an impedance of the photoconductive material layer illuminated by the first light beam of the second wavelength is a function of the intensity profile of the first light beam of the second wavelength.

3. The system of claim 2, wherein the electric field in the electro-optic material layer is spatially modulated based on an impedance change in the photoconductive material layer corresponding to the intensity profile of the first light beam of the second wavelength.

4. The system of claim 2, wherein, when not illuminated by the first light beam of the second wavelength, a magnitude of the impedance of the photoconductive material layer is at least ten times higher than a magnitude of an impedance of the electro-optic material layer.

5. The system of claim 1, wherein the electrode layer, the electro-optic material layer, and the photoconductive material layer each have a curved shape.

6. The system of claim 5, wherein the curved shape comprises at least a portion of a spherical surface.

7. The system of claim 1, further comprising a second light source emitting a second light beam at the at least one wavelength,
    wherein the first light source and the second light source are configured to align the first light beam and the second light beam such that the optical lens caused by the first light beam collimates the second light beam.

8. The system of claim 7, wherein the photoconductive material layer absorbs the first light beam and changes its conductivity in response to absorbing the first light beam.

9. The system of claim 7, further comprising a beam combiner configured to combine the first light beam and the second light beam.

10. The system of claim 9, wherein the beam combiner comprises a fiber-optic beam combiner.

11. The system of claim 7, further comprising a scanning element configured to scan the aligned first light beam and second light beam to move the optical lens in the stack with the second light beam and collimate the second light beam by the optical lens during the scanning.

12. The system of claim 11, wherein the scanning element comprises:

a first scanning element for steering the first light beam; and a second scanning element for steering the second light beam, wherein the first scanning element is synchronized with the second scanning element.

13. The system of claim 1, further comprising a mask configured to spatially modulate the intensity profile of the first light beam of the second wavelength.

14. The system of claim 13, wherein the mask comprises a light intensity modulation function corresponding to the phase profile of the optical lens.

15. The system of claim 7, wherein the second light beam comprises a series of pulses, and the first light beam comprises a continuous wave light beam or a series of pulses.

16. The system of claim 1, further comprising a voltage source configured to apply a voltage signal between the electrode layer and at least one of the electro-optic material layer or the photoconductive material layer.

17. The system of claim 16, wherein the voltage signal is applied between the electrode layer and at least one of the electro-optic material layer or the photoconductive material layer to generate the electric field, the electric field substantially parallel or orthogonal to the electro-optic material layer.

18. A method for making a self-aligning optical lens in a beam scanning system, the method comprising:
forming a travelling lens stack, wherein forming the travelling lens stack comprises:
forming a photoconductive material layer;
forming an electro-optic material layer; and
forming an electrode layer on a side of the electro-optic material layer that is opposite to the photoconductive material layer;
disposing a first light source configured to generate a first light beam at a first wavelength, the first light source oriented relative to the photoconductive material layer to enable the first light source to direct the first light beam towards the photoconductive material layer, the first light beam characterized by an intensity profile; and
connecting a voltage source to the electrode layer and the photoconductive material layer, the voltage source configured to apply a voltage signal across the photoconductive material layer and the electro-optic material layer to generate an electric field within the electro-optic material layer,
wherein the photoconductive material layer is sensitive to the first light beam; and
wherein the intensity profile of the first light beam corresponds to a phase profile of the optical lens such that the first light beam directed to the photoconductive material layer causes the optical lens to be formed in the travelling lens stack.

19. The method of claim 18, further comprising:
disposing a second light source capable of generating a second light beam at a second wavelength, the second light source oriented relative to the photoconductive material layer to enable the second light source to direct the second light beam towards the photoconductive material layer at a location where the first light beam is incident on the photoconductive material layer such that the second light beam is collimated by the optical lens in the travelling lens stack, the photoconductive material layer and the electro-optic material layer transparent to the second light beam.

20. The method of claim 18, wherein an impedance of the photoconductive material layer is a function of light intensities of a beam spot of the first light beam on the photoconductive material layer.

21. The method of claim 18, further comprising:
disposing a beam intensity modulator between the first light source and the travelling lens stack, the beam intensity modulator configured to modulate the intensity profile of the first light beam according to the phase profile of the optical lens.

22. The method of claim 18, further comprising:
disposing a beam combiner between the first light source and the travelling lens stack, the beam combiner configured to align and combine the first light beam and a second light beam at a second wavelength, the photoconductive material layer and the electro-optic material layer transparent to the second light beam; and
disposing a beam steering element between the beam combiner and the travelling lens stack, the beam steering element configured to scan the aligned first light beam and second light beam on the photoconductive material layer to move the optical lens in the travelling lens stack with the second light beam and collimate the second light beam by the optical lens during the scanning.

23. An apparatus comprising:
means for generating a first light beam at a first wavelength, the first light beam characterized by an intensity profile corresponding to a phase profile of an optical lens;
means for directing the first light beam towards a photoconductive material layer, the first light beam causing changes in an impedance of the photoconductive material layer according to the intensity profile of the first light beam; and
means for applying a voltage signal across the photoconductive material layer and an electro-optic material layer to generate an electric field within the electro-optic material layer,
wherein the changes in the impedance of the photoconductive material layer according to the intensity profile of the first light beam modulate the electric field within the electro-optic material layer, causing a localized change in refractive index of the electro-optic material layer induced by the modulated electric field to form the optical lens in the electro-optic material layer.

24. The apparatus of claim 23, further comprising:
means for directing a second light beam at a second wavelength towards the photoconductive material layer at a location where the first light beam is incident on the photoconductive material layer so that the first light beam and the second light beam are aligned and the second light beam is collimated by the optical lens, the photoconductive material layer and the electro-optic material layer transparent to the second light beam.

25. The apparatus of claim 24, wherein the means for directing the first light beam and the means for directing the second light beam are synchronized.

26. The apparatus of claim 24, further comprising:
means for combining the first light beam and the second light beam; and
means for scanning the aligned first light beam and second light beam on the photoconductive material layer to move the optical lens in the electro-optic material layer with the second light beam and collimate the second light beam by the optical lens during the scanning.

27. The apparatus of claim 23, further comprising:
means for modulating the intensity profile of the first light beam according to the phase profile of the optical lens.

28. A non-transitory computer-readable storage medium comprising machine-readable instructions stored thereon, the instructions, when executed by one or more processors, causing the one or more processors to:
generate a first light beam at a first wavelength, the first light beam characterized by an intensity profile corresponding to a phase profile of an optical lens;
direct the first light beam towards a photoconductive material layer, the first light beam causing changes in an impedance of the photoconductive material layer according to the intensity profile of the first light beam; and
apply a voltage signal across the photoconductive material layer and an electro-optic material layer to generate an electric field within the electro-optic material layer,
wherein the changes in the impedance of the photoconductive material layer according to the intensity profile of the first light beam modulate the electric field within the electro-optic material layer, and cause a localized change in refractive index of the electro-optic material layer induced by the modulated electric field to form the optical lens in the electro-optic material layer.

29. The non-transitory computer-readable storage medium of claim 28, wherein the instructions, when executed by the one or more processors, further cause the one or more processors to:
direct a second light beam at a second wavelength towards the photoconductive material layer at a location where the first light beam is incident on the photoconductive material layer such that the first light beam and the second light beam are aligned and the second light beam is collimated by the optical lens, the photoconductive material layer and the electro-optic material layer transparent to the second light beam.

30. The non-transitory computer-readable storage medium of claim 29, wherein the instructions, when executed by the one or more processors, further cause the one or more processors to:
combine the first light beam and the second light beam; and
scan the aligned first light beam and second light beam on the photoconductive material layer using a beam steering element to move the optical lens in the electro-optic material layer with the second light beam and collimate the second light beam by the optical lens during the scanning.

* * * * *